US006462767B1

(12) United States Patent
Obata et al.

(10) Patent No.: US 6,462,767 B1
(45) Date of Patent: Oct. 8, 2002

(54) VIRTUAL PROXIMITY SERVICE CONTROL SYSTEM

(75) Inventors: Akihiko Obata; Kazuo Sasaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/730,268

(22) Filed: Oct. 15, 1996

(30) Foreign Application Priority Data

Nov. 15, 1995 (JP) ............................................. 7-297022
Jun. 27, 1996 (JP) ............................................. 8-167663

(51) Int. Cl.[7] .............................................. H04N 7/14
(52) U.S. Cl. .................................. 348/14.08; 348/14.03
(58) Field of Search ................... 348/12–20; 379/93.07, 379/93.21, 93.23, 202, 355–357, 88.13, 88.21; 370/260, 261; 345/329–332

(56) References Cited

U.S. PATENT DOCUMENTS

| | | | | |
|---|---|---|---|---|
| 5,539,886 A | * | 7/1996 | Aldred et al. ................ | 379/202 |
| 5,592,546 A | * | 1/1997 | Takahashi .................... | 379/355 |
| 5,625,407 A | * | 4/1997 | Biggs et al. .................. | 348/16 |
| 5,689,641 A | * | 11/1997 | Ludwig et al. ............. | 370/260 |
| 5,691,713 A | * | 11/1997 | Ishida ...................... | 379/88.13 |
| 5,793,365 A | * | 8/1998 | Tang et al. .................. | 345/329 |

FOREIGN PATENT DOCUMENTS

| | | |
|---|---|---|
| JP | 5-22724 | 1/1993 |
| JP | 7-162823 | 6/1995 |
| JP | 7-221843 | 8/1995 |

OTHER PUBLICATIONS

Japanese Office Action for Application No. 8–167663 dated Feb. 27, 2001.
Mark J. Abel, Experiences in an Exploratory Distributed Organization, "Intellectual Teamwork", 1990.

Robert S. Fish, et al., The Video Window System in Informal Communications, "CSCW '90 Proceedings", 1990.

Robert W. Root, et al., Design of a Multi–Media Vehicle for Social Browsing, "CSCW '88", 1988.

John C. Tang, et al., Supporting Distributed Groups with a Montage of Lightweight Interactions, "CSCW '94", 1994.

William Gaver, et al., Realizing a Video Environment: Europarc's Rave System "CHI '92", 1992.

Bill Buxton, Future Video Conference System, "NIKKEI Electronics", 1995.

* cited by examiner

Primary Examiner—Curtis Kuntz
Assistant Examiner—George Eng
(74) Attorney, Agent, or Firm—Staas Halsey LLP

(57) ABSTRACT

A virtual proximity service control system capable of realizing informal and unplanned communication and a TV conference with which virtual proximity feeling can be obtained between remote persons in an office. The virtual proximity service uses a network formed by connecting a plurality of communication terminals of users in the office. Prior to commencing communication with the companion, the image of the department to which the companion belongs, information of the members of the department, another person who is performing communication with the department and relative sections, and address information of the terminal of the foregoing persons are acquired to perform communication while considering the state of the companion. Moreover, an opportunity to perform communication with a person adjacent to the companion can be obtained.

40 Claims, 31 Drawing Sheets

FIG. 8

| PHONE DIRECTORY | | | END |
|---|---|---|---|
| DEPARTMENT NAME | MEMBER | RELATIVE SECTION | |
| 1st DEVELOPMENT SECTION<br>2nd DEVELOPMENT SECTION<br>BUSINESS BUREAU<br>DEVELOPMENT SUPPORT BUREAU<br>1st LABORATORY | J.Bevin<br>G.Catlin<br>D.Akeley<br>K.Davis | DEVELOPMENT SUPPORT BUREAU | |
| PHONE | MAIL | FAX | APPROACH | GLANCE |

FIG. 27

| GROUP NAME | MEMBER NAME | NUMBER OF IMAGE SERVER |
|---|---|---|
| 1st LABORATORY | | |
| | V. Nelson | IMAGE SERVER7 |
| | A. Porrish | IMAGE SERVER8 |
| 2nd LABORATORY | | |
| | N. Ridley | IMAGE SERVER7 |
| | R. Sherriff | IMAGE SERVER8 |

FIG. 28

| PHONE DIRECTORY | VISIT END |
|---|---|
| GROUP NAME | MEMBER NAME |
| 1st DEVEVLOPMENT SECTION | J. Bevin |
| 2nd DEVEVLOPMENT SECTION | G. Catlin |
| 1st LABORATORY | D. Akeley |
| 2nd LABORATORY | K. Davis |

FIG. 30

| NAME | COORDINATES |
|---|---|
| E. Tellen | (0,0)-(80,60) |
| J. Bevin | (80,0)-(160,60) |
| J. Farley | (0,60)-(80,120) |
| O. Jewett | (80,60)-(160,120) |

VIRTUAL PROXIMITY SERVICE CONTROL SYSTEM

BACKGROUND OF THE INVENTION

1. Field of the Invention

The present invention relates to a virtual proximity service control system for realizing communication among persons at distant places in a virtual and proximate state by using a communication network system formed by connecting a plurality of user terminals.

2. Description of Related Art

In recent years, cost reduction of image compressing apparatuses and improvement in the networks result in a TV telephone service being realized. However, the service has not been used widely. The reason for this is that the image simply showing the face during the conversation is not considered so important. Moreover, the cost performance has not been evaluated yet.

On the other hand, development of a new service formed by combining computers and the communication technology, that is, development of a group wear has been performed energetically. The development of the group wear has been performed by, in addition to technical experts, psychologists and social psychologists. In the situation above, an informal communication service has attracting attention. Also informal communication accidentally taking place between members has an important factor for improving the intellectual productivity in an office as well as formal communication, such as conferences and meetings. Specifically, it has been proved that places in which informal communication takes place frequently, for example, the same floor and the same building in an office, are places in which new projects are frequently created.

Accordingly, development has been performed such that the conventional TV telephone is contrived to cause the communication between remote departments to approach a state as if communication between adjacent persons is performed, that is, a virtual proximity feeling is provided for the purpose of making the TV telephone to be more effective service.

As for the system in the earliest stage of the research and development of the virtual proximity system, refer to Intellectual Teamwork (pp. 489–510, Mark J. Abel, 18: Experiences in an Exploratory Distributed Organization). The foregoing thesis has disclosed a result of an experiment carried out such that one project team is divided into two remote sections which are always connected to each other through a TV conference system. According to the experiment above, 70% of communication occurring due to dropping-in was performed in place of the planned conferences. According to an experiment of Video Window (Fish, R. et al. The Video Window System in Informal Communications. Proc. CSCW' 90) in which refresh rooms were always connected by a TV conference system, eye contact is an important factor to start the informal communication. The foregoing experiments suggest a possibility that image link is able to support the informal communication. However, communication among a plurality of departments cannot be performed and a problem of cost arises when employed practically. Accordingly, a system established on the basis of desktop terminals has been developed in place of the system formed on the basis of the foregoing TV conference room.

As the desktop system, the following structures are exemplified: CRUISER (Root, R. et al. Design of a Multi-Media Vehicle for Social Browsing, Proc. CSCW' 88, Fish, R. et al. Evaluating Video as a Technology for Informal Communication. Proc. CHI'92), Montage (Tang, J. et al. Supporting Distributed Groups with a Montage of Lightweight Interactions. Proc. CSCW'94), RAVE (Gaver, W. et al. REALIZING A VIDEO ENVIRONMENT: EUROPARC'S RAVE SYSTEM. Proc. CHI' 92), and Ubiquitous Video (Buxton, B. "Future Video Conference system", Nikkey Electronics, 1995. 3.27). The foregoing services simulate a state where each member of an office is provided with a single room and the member walks on a passage virtually realized on a network. In place of the conventional TV telephone having the structure such that the number of the companion is designated, the ringing (ringer bell) sound is produced and voice and image links are connected when the companion responds, a user is able to see the room to which the companion belongs, followed by commencing conversation. The foregoing system enables communication actions between adjacent persons to be realized on a network such that a person walks the passage to see the state of the companion through the door and, if the companion is able to hold communication, the person calls the companion.

However, a report has been made that the experiment of CRUISER resulted in no considerable effect to be obtained as compared with the method of usage of the conventional telephone system. In order to prevent a problem of privacy taking place when the image link is connected to see the room of the companion, the terminal of the companion displays the image of the sender when the sender sees the office so as to be recognized by the companion. Therefore, the recipient side is caused to see the image of the companion in place of the ringing sound when the companion makes a call. Thus, an effect similar to ringing of the telephone acts on the receiver. As a result, any considerable effect cannot be obtained as compared with the usual telephone or the TV telephone system.

On the other hand, RAVE has a structure such that the bi-directional image link is not provided but only single direction image link is established. Moreover, door knocking sound is provided for the person who is looked by a visitor. Ubiquitous Video has a contrivance that image information of a person who sees the companion is displayed on a video monitor disposed on the rear side of the person who is looked. Although no report has been made from the foregoing structures, RAVE has the structure that the ringing sound of the telephone is simply replaced by the knocking sound and Ubiquitous Video requires the companion to turn the companion's face to detect the visitor. Thus, the foregoing methods cannot easily be accepted.

The conventional services enable the state of the companion, intended to be communicated, to be previously detected with an image so that the communication is performed more easily. However, accidental communication cannot be simulated as if a person walking a passage accidentally comes on a companion and starts conversation because the person recalls a business, that is, the conventional method cannot simulate accidental communication with a companion with which the user has no intention of communication.

The conventional system CRUISER has provided a service for realizing accidental communication by creating a virtual passage composed of a route sequentially connecting plural departments and set by a user and "autocruise" with which a route is automatically generated by a computer at a random time. According to a report of the experiment, substantially no virtual passage was created by the user. The reason for this can be considered that meaningless setting of intermediate route cannot easily be performed because one room is the goal of walking on the passage. The operation for randomly setting the route by the computer resulted in the users feeling nuisance because the companion is absent or having a conversation when the image link has been connected and thus the conversation cannot be held. As a result, accidental communication cannot satisfactorily be simulated.

SUMMARY OF THE INVENTION

An object of the present invention is to provide a virtual proximity service control system enabling a user to start conversation with a remote companion as an adjacent person without disturbing the work of the companion.

Another object of the present invention is to provide a virtual proximity service control system capable of realizing informal communication with which virtual proximity feeling can be obtained between remote persons.

Another object of the present invention is to provide a virtual proximity service control system capable of realizing unplanned communication between remote persons.

Another object of the present invention is to provide a virtual proximity service control system capable of defining a plurality of users as members of a group independently to the physical positions of the users.

Another object of the present invention is to provide a virtual proximity service control system capable of performing a TV conference by using an image input unit provided for an image server without an image input unit for the communication terminal for each user.

Another object of the present invention is to provide a virtual proximity service control system capable of efficiently performing communication by switching the quality of the image between a case where a user visits a companion and a case where a TV conference is held.

The virtual proximity service control system according to the present invention enables remote persons to perform communication by using a network to which a plurality of communication terminals provided for the users in an office are connected. Prior to starting conversation with the companion, information of the members in the department to which the companion belongs, other persons who are communicating the department and other departments relative to the department, and image information, voice information, communication state and terminal addresses of the members are acquired. Thus, communication can be performed while considering the state of the companion. Moreover, an opportunity to start communication with a person near the companion, that is, another member in the department or another person communicating the department, can be provided. Thus, informal and unplanned communication with which virtual proximate feeling can be obtained, can be performed between remote persons in an office. Moreover, only a simple structure is required to perform a TV conference among remote users.

The above and further objects and features of the invention will more fully be apparent from the following detailed description with accompanying drawings.

BRIEF DESCRIPTION OF THE DRAWINGS

FIG. 8 is a diagram showing an example of a displayed screen (an initial screen of a user terminal) according to the first embodiment;

FIG. 27 is a diagram showing phone directory data registered to the user terminal according to the second embodiment;

FIG. 28 is a diagram showing an example of a displayed screen of the user terminal according to the second embodiment;

FIG. 30 is a diagram showing coordinate information in the image server according to the second embodiment.

DESCRIPTION OF THE PREFERRED EMBODIMENTS (First Embodiment)

Figure 1:
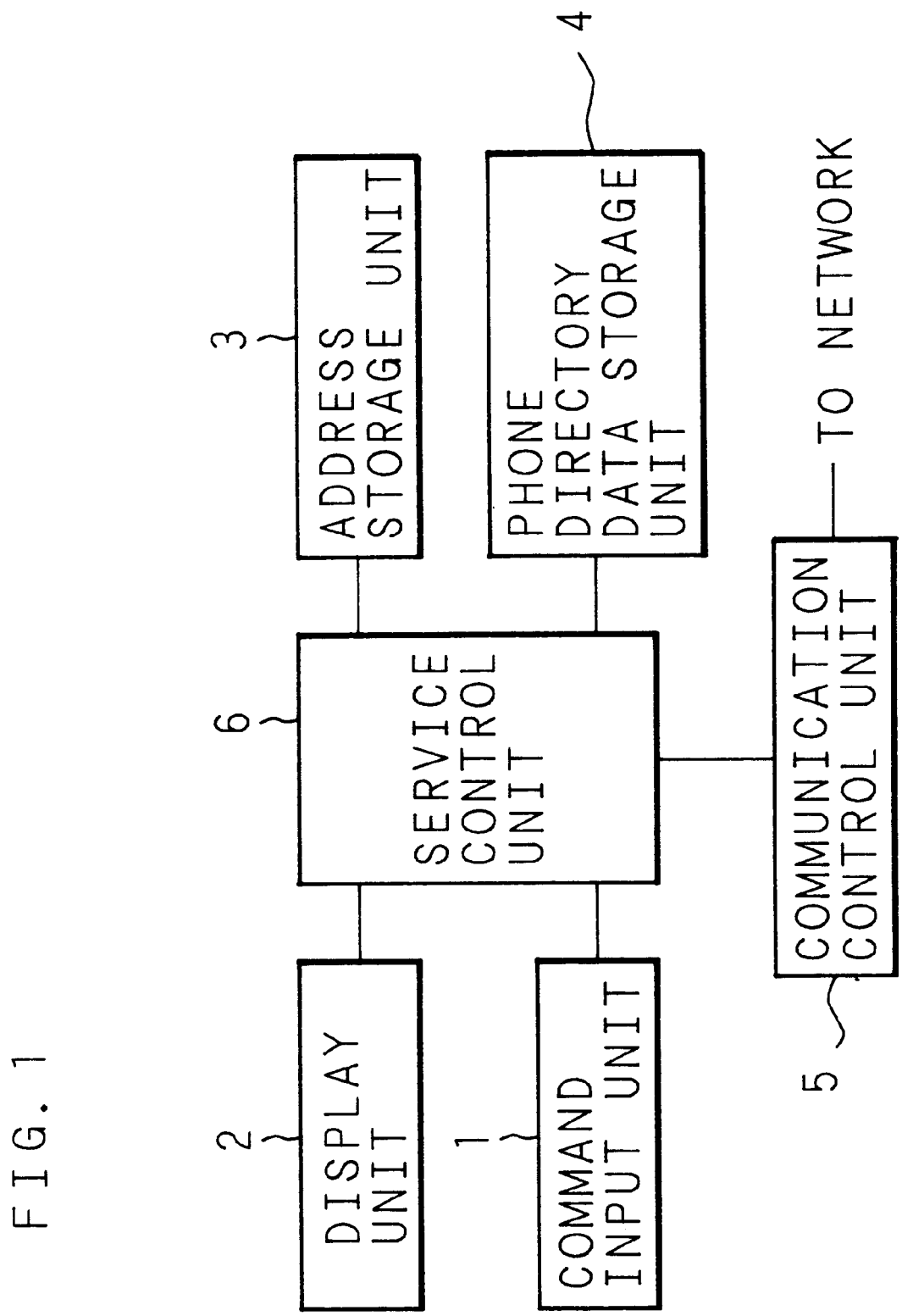
FIG. 1 is a diagram (a structure view of each user terminal) showing the principle of a first embodiment of the present invention.
Figure 2:
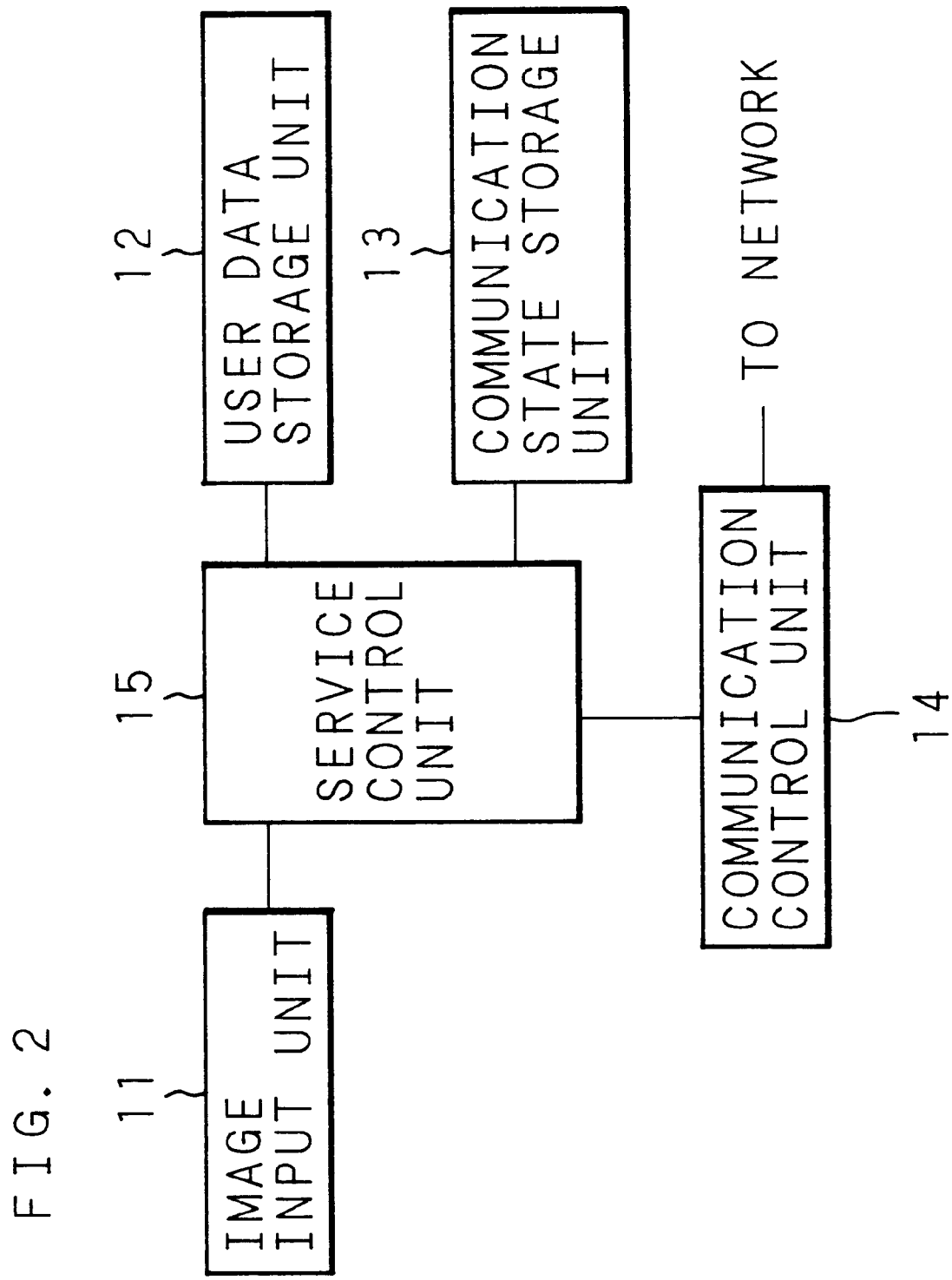
FIG. 2 is a diagram (a structural view of an image server) showing the principle of the first embodiment.

FIGS. 1 and 2 show the principle of a first embodiment of the present invention. FIG. 1 shows the structure of an image server, and FIG. 2 shows the structure of an image server shared by a plurality of user terminals. Each user terminal includes a command input unit 1, a display unit 2, an address storage unit 3, a phone directory data storage unit 4, a communication control unit 5 and a service control unit 6. An input performed by a user is received by the command input unit 1, and then transferred to the service control unit 6. The display unit 2 is controlled by the service control unit 6 so as to display image information and a state of communication performed by the companion of the communication. The address storage unit 3 stores the address of an image server which displays the overall image of a group (a department) to which the user terminal belongs. The phone directory data storage unit 4 stores names and addresses of the terminals of the companions, names of groups (departments) which are the companions of the communication and addresses of the image servers of the companions of the communication. The communication control unit 5 communicates information through a communication line of the network. The service control unit 6 transmits, to the image server, a demand in accordance with an input performed by a user, controls display of received information on the display unit 2 and reads data stored in the address storage unit 3 and the phone directory data storage unit 4.

As shown in FIG. 2, the image server includes an image input unit 11, a user data storage unit 12, a communication state storage unit 13, a communication control unit 14 and a service control unit 15. The image input unit 11 photographs the overall image of a group (a department) shared by a plurality of user terminals to transfer the photographed image to the service control unit 15. The user data storage unit 12 stores data of users belonging to the group (the department). The communication state storage unit 13 stores states of communication operations performed by the group (the department). The communication control unit 14 communicates information through a communication line of the network. The service control unit 15 controls, in accordance with a demand from the network, various information items, such as image information and user information, and a process for transmitting the state of the communication.

Figure 3:
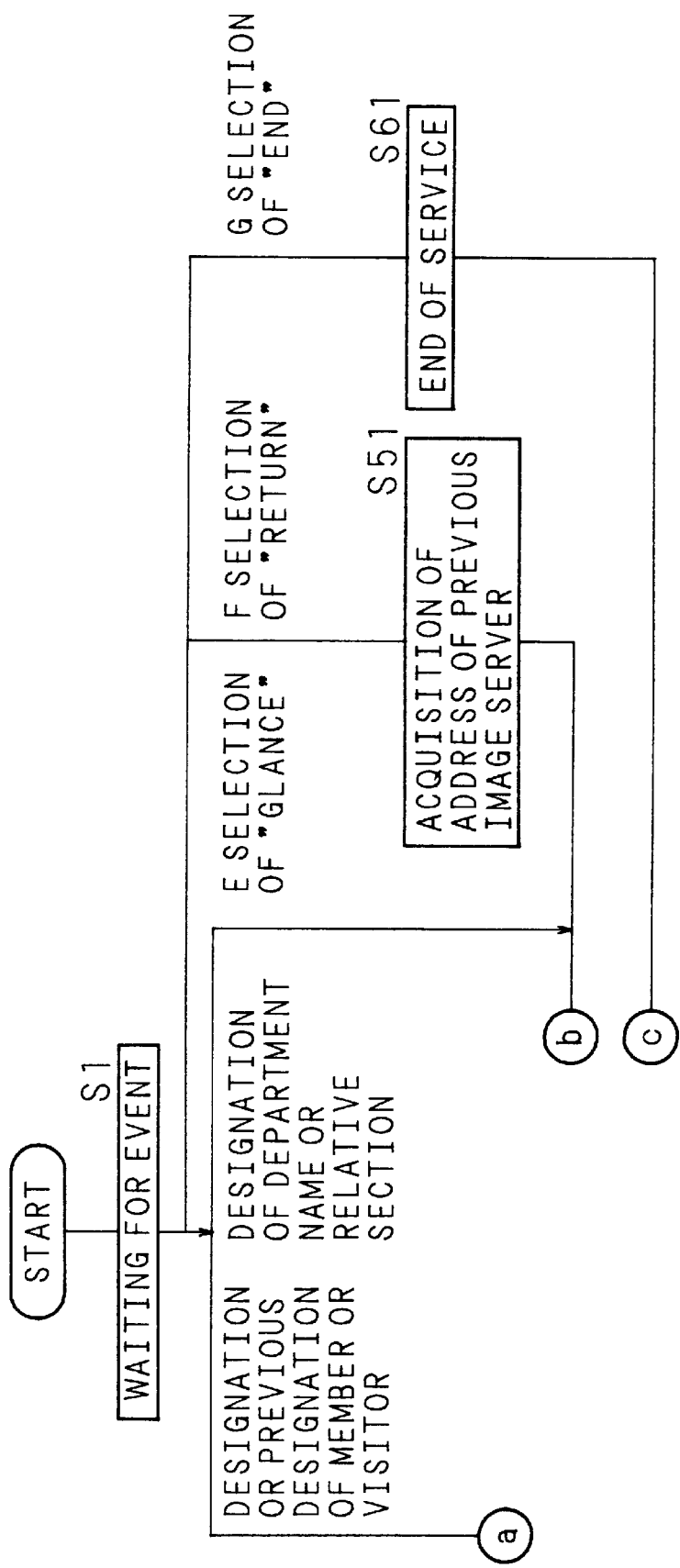
FIG. 3 is a flow chart showing the principle of the operation of the first embodiment.
Figure 4:
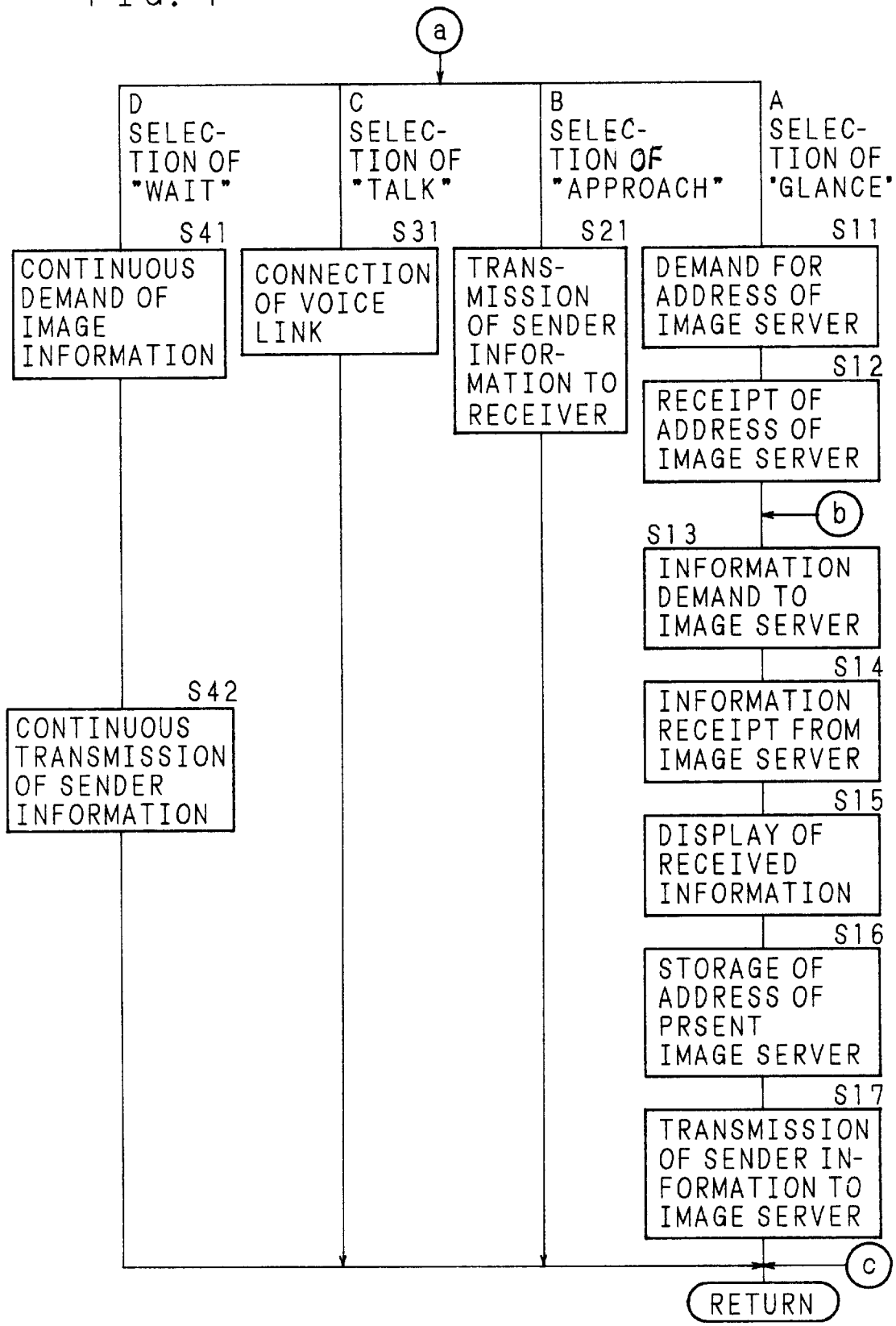
FIG. 4 is a flow chart showing the principle of the operation of the first embodiment.

FIGS. 3 and 4 show a flow chart explaining the principle of the operation of the first embodiment. Initially, when a user turns on a communication application on the terminal, an event wait state is realized (step S1). Then, the user designates a member of a group or a group (a department) intended to be communicated, and then selects a required event from a group consisting of six events "GLANCE", "APPROACH", "TALK", "WAIT", "RETURN" and "END". As a result of the designation and selection processes, the operation is branched into seven routes indicated with symbols A to G shown in FIGS. 3 and 4. The routes A, B, C and D are selected in a case where a member or a visitor will be designated or has been designated and "GLANCE", "APPROACH", "TALK" or "WAIT" has been selected. The route E is selected when a department or a relative section has been designated and "GLANCE" has been selected. The routes F and G are selected when "RETURN" or "END" has been selected.

In a case where a state of a companion intended to be communicated with is intended to be observed, a sender designates the member who is the companion, and then selects "GLANCE" (the route A). When "GLANCE" has been selected, the address of the image server of the department, to which the member, who is the companion, belongs is required (step S11), and the address is received (step S12). In accordance with the received address, information (image information, voice information, communication state and terminal address of members and another person executing "GLANCE" toward the department, and information of relative sections) is required to the image server (step S13), and then the information is received (step S14). Then, received information is displayed on the screen of the sender (step S15), and then the address of present image server is stored (step S16). Then, information of the sender, such as name of the sender and the address of the terminal of the sender, is transferred to the image sever (step S17), and then the operation returns. As a result, a state of the designated companion can easily be confirmed.

In a case where intention of communication is communicated with the companion, the sender designates the member, who is the companion of the communication, and then selects "APPROACH" (the route B). When "APPROACH" has been selected, information of the sender, such as name of the sender and the address of the terminal of the sender, is transferred to the terminal of the companion, and then displayed on the screen of the terminal of the companion (step S21). Then, the operation returns. As a result, the intention of the sender to perform communication can be transferred to the companion. Note that the image of the sender may simultaneously be transferred to the companion so as to be displayed on the screen of the terminal of the companion.

In a case where the user intends to talk with the companion of the communication, the sender designates the member, who is the companion of the communication, and then selects "TALK" (the route C). When "TALK" has been selected, a voice link is connected to the terminal of the companion of the communication (step S31), and then the operation returns. Thus, a direct talk can be performed without a calling operation.

If the sender waits for a short while due to absence of the companion or the line of the companion being busy, the sender selects "WAIT" (the route D). When "WAIT" has been selected, a demand to continuously supply image is issued to the image server of the department to which the companion of the communication belongs. Required image information is received so as to be displayed on the terminal of the sender (step S41). Then, sender's information (the image of the sender included sometimes) is continuously transmitted to the terminal of the companion or the image server of the group at the companion side (step S43). Then, the operation returns. As a result, the sender is able to perform waiting while observing the state of the companion.

In a case where the sender has designated the department and then selected "GLANCE" (route E), the operation executes the steps S13 to S17 same as those of route A, and returns. As a result, the state of the designated department can easily be confirmed.

In a case where a member or a department, which has been designated, is intended to be designated, the sender selects "RETURN" (the route F). When "RETURN" has been selected, the address of the previous image server stored in step S16 is acquired (step S51), and then the operation executes the steps S13 to S17 same as those of route A. Then, the operation returns. As a result, the communication with the member or the department, which has been performed the communication, can immediately be restored.

In a case where the foregoing service using the network is intended to be ended, "END" is selected (the route G). When "END" has been selected, all of the processes are ended, such that the image and voice links are suspended (step S61). Then, the operation returns.

In a case where a member (or a department) has been designated and "GLANCE" has been selected, information including an image showing the state of the department, to which the designated member belongs (or the designated department), is displayed on the screen of the sender. Moreover, name of a section relative to the designated department and information of another sender (a virtual visitor) who is using the service according to the first embodiment with the department are displayed. When the sender designates the displayed virtual visitor and selects "GLANCE", "APPROACH", "TALK" or "WAIT", processes (the routes A, B, C and D) are performed which are similar to those performed when the member has been designated. When the relative section, which is being displayed, is designated and "GLANCE" is selected, a process (the route E) is performed which is similar to that performed when a department is designated. Thus, the sender is permitted to arbitrarily glance at the relative section so that the sender simulates visiting the office to achieve a sender's purpose.

The system according to this embodiment has a structure such that image information of a department is displayed at a time selected by a computer regardless of the intention of the user. Thus, the user is permitted to suddenly intend and call a person displayed on the screen or select "TALK" to start a conversation. Thus, unplanned communication between near persons as if the user comes on a person on a passage and starts a conversation can be realized with a remote person. In the foregoing case, the frequency of communication with each department is obtained to weight the appearance frequency of image information of the department in accordance with the communication frequency or the variation with time so that an effective result is realized as compared with a structure in which image information of departments is randomly selected and displayed. If image information of other departments is displayed during a period in which the user is not operating the terminal, the operation using the terminal is not inhibited and a rational advantage can be realized.

Figure 5:
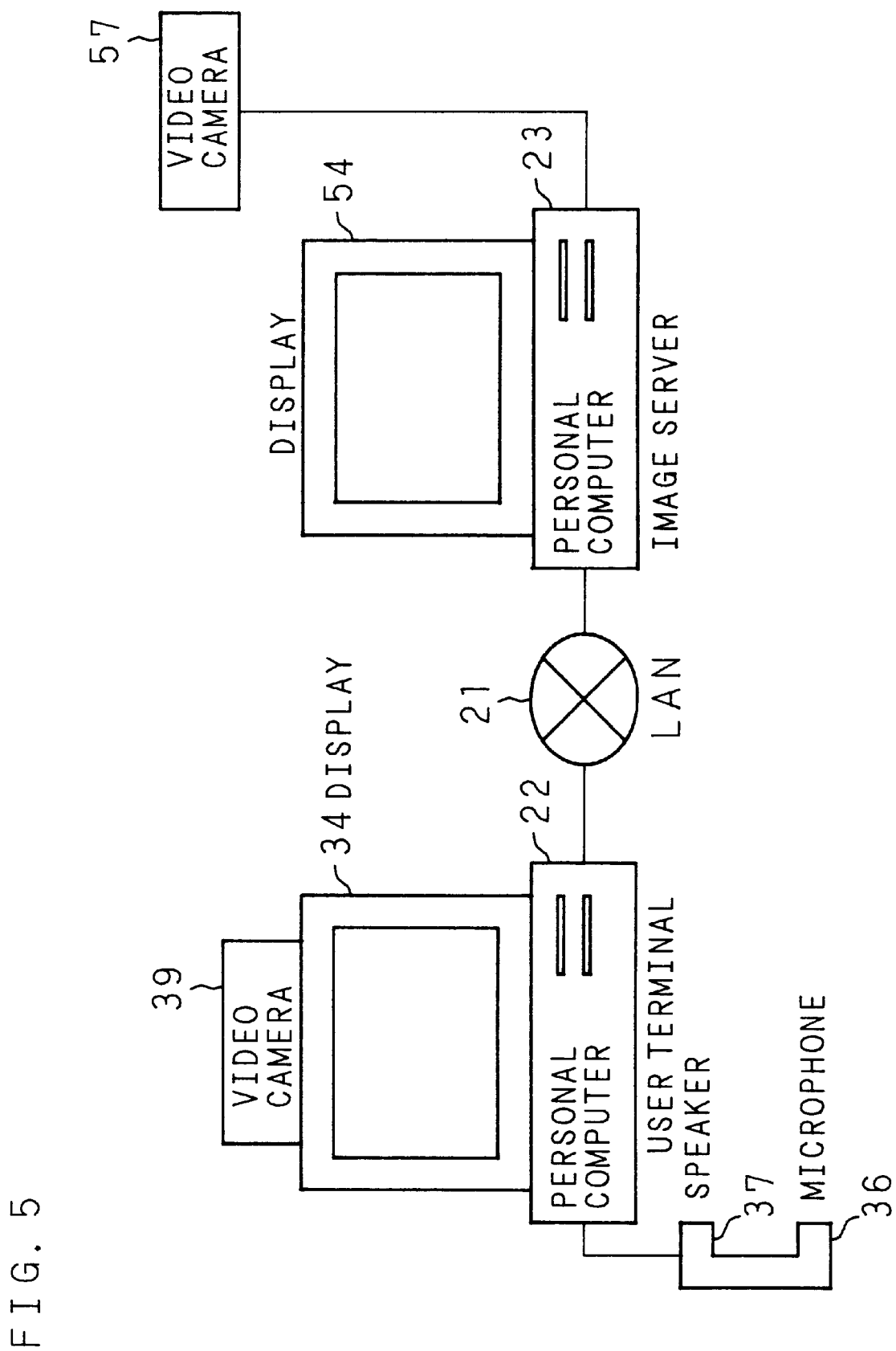
FIG. 5 is a diagram showing an example of the structure of the system of the first embodiment.

FIG. 5 is a diagram showing an example of the system structure of a communication terminal according to the first embodiment. Referring to FIG. 5, reference numeral 21 represents a LAN (Local Area Network). User terminals assigned to the members in the office and image servers respectively provided for the departments so as to be shared by a plurality of user terminals are connected to the LAN 21.

Figure 6:
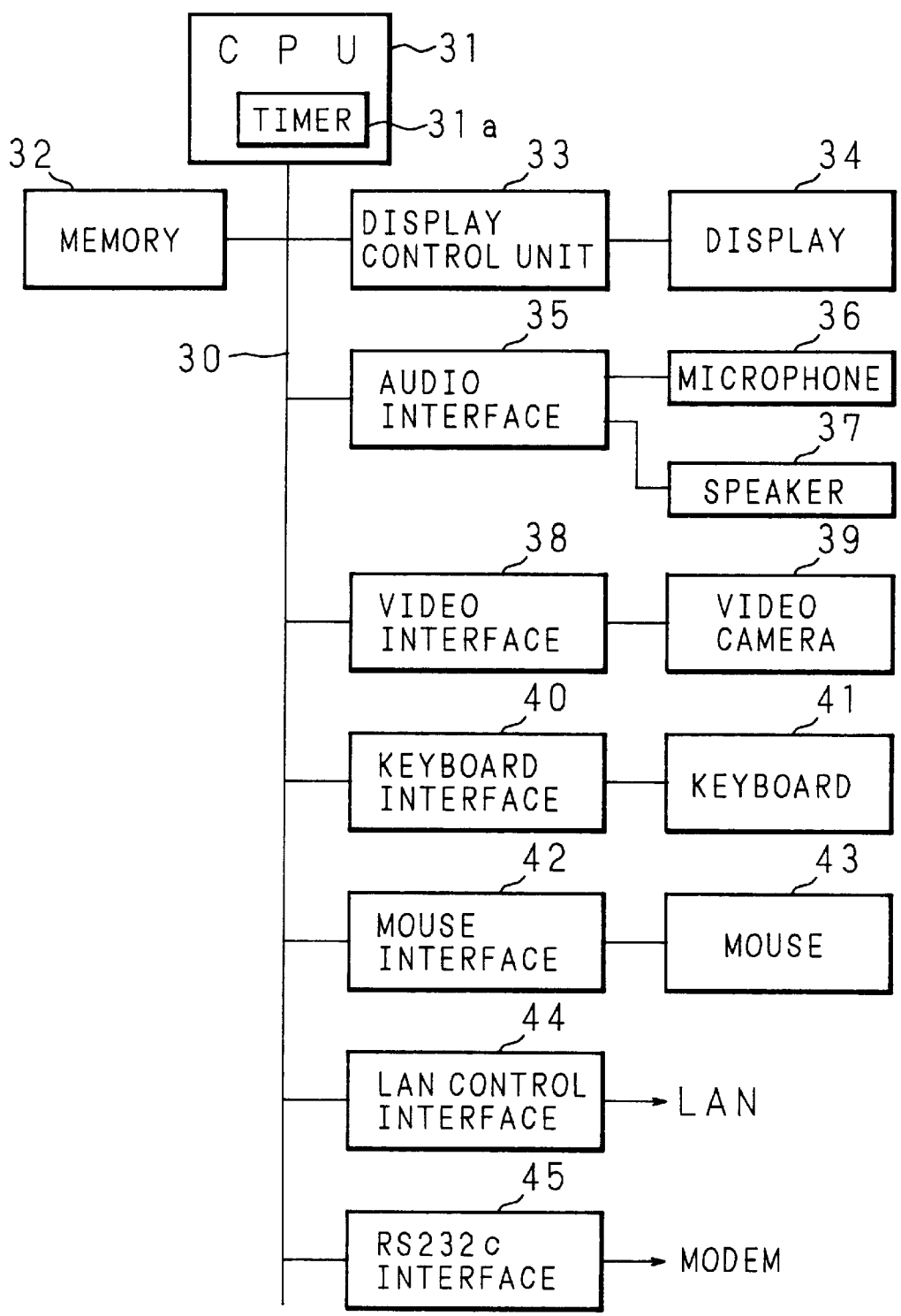
FIG. 6 is a block diagram showing an example of the structure of the system of the user terminal according to the first embodiment.

The user terminal has a personal computer 22, a video camera 39 for acquiring the image of the user, a display 34 for displaying information received through the LAN 21, a microphone 36, a speaker 37 and so forth. FIG. 6 is a block diagram showing an example of the system structure of the user terminal. Referring to FIG. 6, reference numeral 30 represents a data bus. A CPU 31 for controlling the operation of the user terminal and a memory 32 serving as a storage unit for storing various information items are connected to the data bus 30. The CPU 31 includes a timer 31a for performing a time counting process. The display 34 is connected to the data bus 30 through a display control unit 33, the microphone 36 and the speaker 37 are connected to the same through an audio interface 35, the video camera 39 is connected to the same through a video interface 38, a keyboard 41 is connected to the same through a keyboard interface 40, and a mouse 43 is connected to the same through a mouse interface 42. A LAN control interface 44 connected to the LAN 21 and an RS232c interface 45 connected to a modem (not shown) are connected to the data bus 30.

Figure 7:
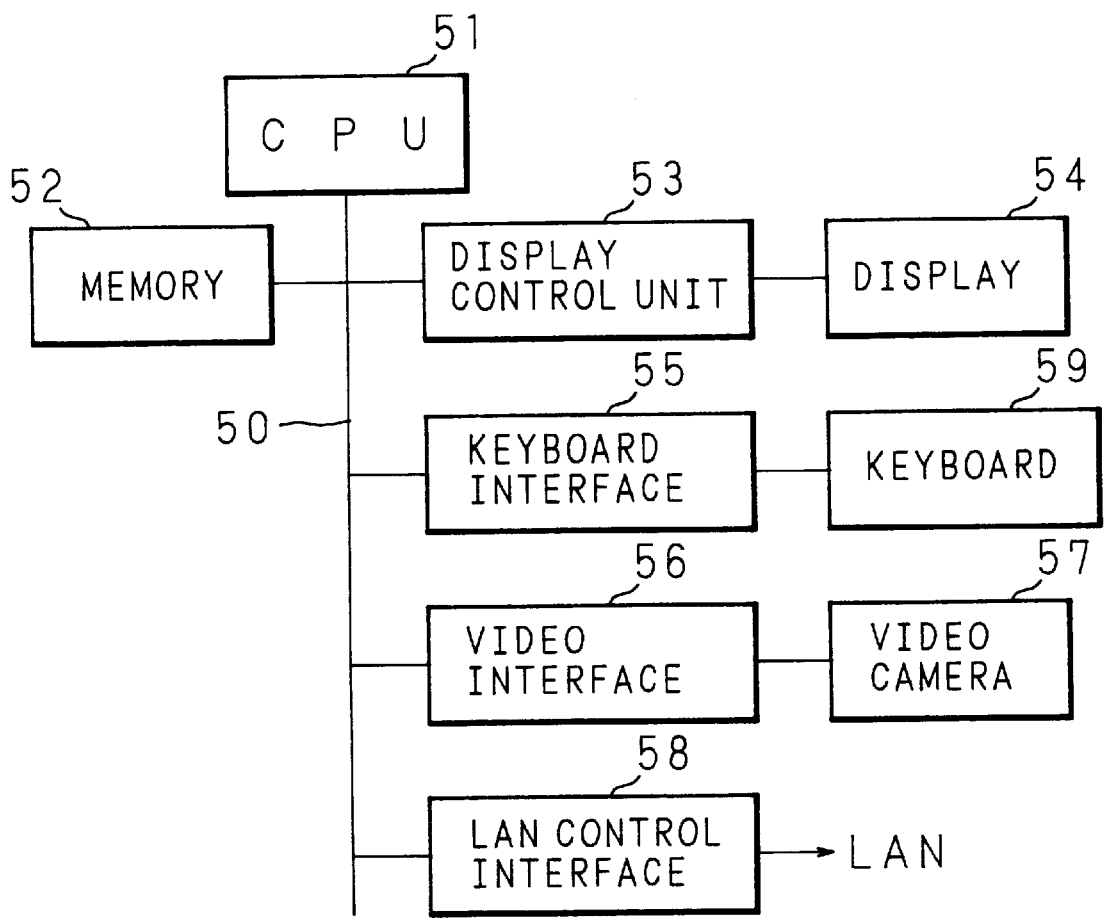
FIG. 7 is a block diagram showing an example of the structure of the system of the image server according to the first embodiment.

The image server has a personal computer 23, a video camera 57 for acquiring the image of the department, in which the video camera 57 is disposed, a display 54 for displaying information of the user received through the LAN 21 and so forth. FIG. 7 is a block diagram showing an example of the system structure of the image server. Referring to FIG. 7, reference numeral 50 represents a data bus. A CPU 51 for controlling the operation of the image server, a memory 52 serving as a storage portion for storing various information items and, through a keyboard interface 55, a keyboard 59 are connected to the data bus 50. Moreover, the display 54 is connected to the data bus 50 through a display control unit 53 and the video camera 57 is connected to the same through a video interface 56. A LAN control interface 58 connected to the LAN 21 is connected to the data bus 50.

The system structures shown in FIGS. 6 and 7 are the system structures for general multimedia personal computers.

Referring to examples of screens shown in FIGS. 8 to 11, the flow of the service and that of the control according to the first embodiment will now be described.

FIG. 8 shows a phone directory window which is an initial screen to be displayed on the display 34 when the application on the user terminal has been turned on. A user (a sender) who intends to perform communication designates name of a required department or a member on the initial screen shown in FIG. 8. The designating operation is performed by, for example, clicking with the mouse 43. All of the departments of, for example, a company have been registered, while relative sections are registered such that departments personally relative to the user (the sender) have been registered. When the user designates the member and selects PHONE, FAX or MAIL, a conventional communication means can be selected.

When name of the department or the member has been selected and "GLANCE" has been selected by clicking the same with the mouse 43, a demand for communication is transferred to the image server of the subject department or the department to which the member belongs. When the image server receives the demand, it acquires present image information, and then transmits the image information item to the sender who has demanded the communication. Since the outline of the state of the member is simply required to be detected in this case, a still image is sufficient as the image to be transmitted. Moreover, user data and information of the communication state controlled by the image server are transferred.

User data includes, registered thereto, names of members to be photographed by the image server, information, such as the addresses of the terminals, names of relative sections and the communication addresses of the image servers of the relative sections. Information of the communication state includes, registered thereto, names of other users who have made an access to the image server and who are seeing the image, addresses of the terminals, name of another user who is performing communication with the member photographed by the image server, the address of the terminal, the state of communication and so forth. In a case where no one exists in the department due to a holiday or the like, a message indicating this may be transmitted in place of image information. Voice information may be transferred as well image information.

Figure 9:
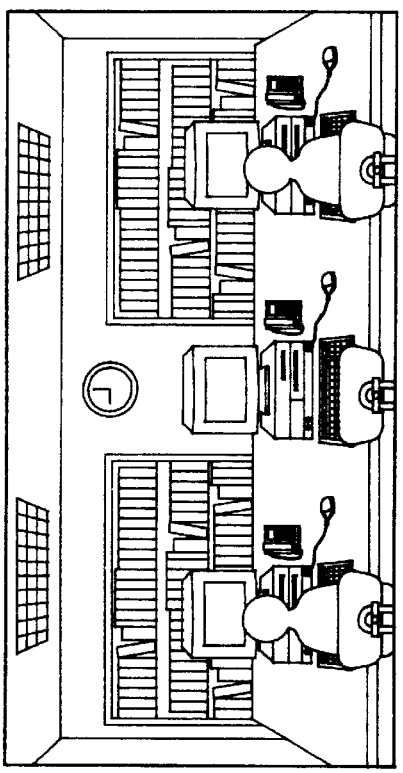
FIG. 9 is a diagram showing an example of a displayed screen (a screen of a user terminal of a sender) according to the first embodiment.

FIG. 9 shows a screen of the sender when First Development Section has been designated and "SEE" has been selected. The image of the office (First Development Section) transmitted from the image server is displayed. The foregoing image corresponds to an image obtained by a person who sees the overall state of First Development Section sectioned by a partition. The members who are photographed by the image server and their communication state information are displayed on a list box for the members, while name of the relative sections are displayed on a list box for the relative sections.

A list box for visitors displays name of another user (a virtual visitor) who is performing communication with any one of members in First Development Section and name of another user (a virtual visitor) who has made an access to the image server and is seeing the image of First Development Section, the list box for virtual visitors as well as displaying information of the communication state. For example, a fact that E. Harlan, who is a virtual visitor, is talking with Ellison of First Development Section on the phone and a fact that M. Edwin, who is another virtual visitor, is virtually seeing the image of First Development Section, that is, he is visiting First Development Section are displayed. Although FIG. 9 shows the example in which information of the virtual visitors is displayed with only character information, image information and/or voice information of the virtual visitors may be exhibited in addition to character information.

Figure 10:
FIG. 10 is a diagram showing an example of a displayed screen (a screen of the image server) according to the first embodiment.

A message, as shown in FIG. 10, that the sender is visiting First Development Section, is displayed on the display 54 to communicate this with the members of First Development Section who are being photographed by the image server. The message may be communicated by a method in which it is transmitted to a terminal which is registered to user information of the image server when the state of communication state control data has been changed or a method in which it is transferred when the user terminal has required the image server to supply information of communication state control data or a method in which it is displayed on the display 54 of the image server. Communication state control data of image server is controlled in accordance with information communicated whenever the communication state of the user is changed.

The communication of the message as shown in FIG. 10 simulates an indication of any one being visiting First Development Section, that is, whether the visitor (the sender) is visiting the user or another member cannot be recognized. By adding image information acquired from the video camera 39 of the terminal of the sender to the communication message as shown in FIG. 10, the face of the visitor can be recognized whose name is not known by the user.

Buttons for the communication service in the lower portion of the display screen shown in FIG. 9 are clicked after the member or name of the department has been designated in the list box for the members, relative sections and visitors. In a case where a member has been selected and designated in a state of the displayed screen shown in FIG. 8, name of the designated member in the list box is displayed in the inverted screen display manner and thus a state has been realized in which the member has been selected.

The sender confirms the image transmitted from the image server showing the state of First Development Section. When a companion intended to be communicated exists, a call can be made by clicking the button "PHONE". If "TALK" is selected, the bi-directional voice link is connected directly so that talking with the companion is permitted without ringing as the telephone. If the companion is absent, "MAIL" or "FAX" is selected.

To overcome complicated operation required when call is performed frequently, a user interface may be provided in which the member is designated in the displayed screen shown in FIG. 8; "GLANCE" is selected; the image shown in FIG. 9 is transmitted, and "PHONE" call is made automatically after a predetermined time has elapsed, wherein phone call is canceled if another button is clicked before the predetermined time is elapsed. Another method may be employed in which phone call is not immediately performed even if "PHONE" is selected on the displayed screen shown in FIG. 8 but information shown in FIG. 9 is transferred; phone call is made after a predetermined time has elapsed; and shift to a next operation is inhibited if no instruction is issued from the sender on the displayed screen shown in FIG. 9 when "GLANCE" has been selected on the displayed screen shown in FIG. 8.

In a case where the screen shown in FIG. 9 is being displayed and the companion intended to be communicated on urgent business is absent, electronic mail or the like is not transmitted but "WAIT" is selected. Thus, image information shown in FIG. 9 is periodically transferred from the image server to the sender so that the sender easily recognizes return of the companion to the position for the companion. In this case, the still image is switched to a movie or a motive still image. Thus, change in the state of the department can be confirmed and the sender calls the companion after the companion has returned.

The function of selecting "WAIT" can be used also in a case where the companion who exists is busy or talking with another member. In a case where "WAIT" is selected before "APPROACH" is selected, the information of the companion whom the sender is waiting for cannot be communicated to the companion in this case, the companion does not interrupt the conversation with the other member or the work.

Figure 11:
FIG. 11 is a diagram showing an example of a displayed screen (a screen of a user terminal of a receiver) according to the first embodiment.

If the sender selects "APPROACH", information of the sender is, as shown in FIG. 11, displayed on the display 34 of the user terminal of the companion. The foregoing operation simulates that the person enters the First Development Section to stand in front of the seat of the companion or looks at the companion to make a sign of an intention of talking. For example, the foregoing function is used to communicate an intention to request to make a talk after the conversion with the other person has been performed. Thus, a consideration of the user not to suddenly cut into the conversion with the telephone is simulated. In this case, the companion sees the screen to detect a receipt and click "PHONE" or "TALK" button so that the state of talking is realized. If the companion does not detect the display, the companion continues the work. In the displayed screen shown in FIG. 9, "APPROACH" can be selected when the operation is more urgent as compared with "WAIT" but the same is not so urgent as compared with "PHONE".

When "APPROACH" has been selected, the video camera 39 provided for each user to photograph the user transmits image information of the sender to the companion to display the image information item on the user terminal of the companion. If the image of the sender is transmitted in the case where "APPROACH" has been selected, the image of a person, whose name is not known, can conveniently be transmitted to the companion.

If "WAIT" is selected in the case where the companion of the communication is absent, the bi-directional image link is established so that image information of the sender is added to the displayed screen shown in FIG. 11. The foregoing operation corresponds to waiting for return of the companion near the seat of the companion during communication with an adjacent colleague. Also image information required at this time may be motive still images. Since the bi-directional image link has been established between the sender and the companion in the foregoing case, the companion is able to detect the sender waiting for the companion and, thus, talking can immediately be commenced. If image information of the sender is added, timing at which the sender and the companion exist can easily be detected even if the sender waiting for the companion leaves the seat. As a result, communication more approximating actual state can be performed efficiently.

When "APPROACH" is selected on the displayed screen shown in FIG. 8, information shown in FIG. 9 is transmitted to the sender. Moreover, information shown in FIG. 11 is transmitted to the companion of the communication. Thus, the intention of the sender to perform communication can directly be transmitted to the companion without a necessity of detecting the state of the companion.

When the visitor and the relative section have been selected on the displayed screen shown in FIG. 8 or FIG. 9 and then "GLANCE" has been selected, information of the department to which the visitor belongs and information of the relative section are transmitted from each of the subject image servers to the sender, similarly to the process performed with respect to First Development Section. If "RETURN" is selected afterwards, an access to the image server of First Development Section, which has been selected previously, is again made so that original information of First Development Section is restored. By tracing the relationship of the relative sections and the visitors, a simulation can be performed as arbitrarily walking through a plurality of remote departments. If a selection of the member is performed in the state shown in FIG. 8, selection of "GLANCE" is made to be invalid since an access has been made to the image server.

If "END" is selected on the displayed screen shown in FIG. 8 or FIG. 9, the proximity control service according to this embodiment is ended.

The foregoing structure may be arranged in such a manner that the image link may be cut if the sender selects "GLANCE", followed by setting the timer without afterward selection of "APPROACH" or "TALK" within a predetermined period of time. Another arrangement may be employed in which: after the sender has selected "APPROACH" followed by setting the timer without afterward selection of "TALK" within a predetermined period of time, the image link is cut. As a result, continuous connection of the lines causing a wasteful communication cost can be saved. If the sender selects "WAIT" after the sender has selected "GLANCE" or "APPROACH", setting of the timer is canceled so that the image link is maintained until "END" is selected. Note that the receiver is able to cancel setting of the timer.

During a talk performed by using the service according to this embodiment, a call or visit of a visitor is probable with respect to the companion. In this case, an arrangement may be employed in which "WAIT" is selected to maintain the voice link, and "TALK" is again selected after the companion has completed the work to temporarily interrupt the talk.

Although the foregoing embodiment has the structure such that image information of the sender is, together with character information of the sender, transmitted when the sender has selected "GLANCE" or "APPROACH", only the character information of the sender or the presence/nonpresence information detected by a sensor may be transmitted and displayed.

Although the foregoing embodiment has the structure such that the image server is used, it might be considered feasible to employ a method of realizing the foregoing structure by only the user terminal without the image server. In this case, each user is provided with a video card having two video input terminals which can be switched. Either of the video card is connected to the video camera for photographing the user, while the other video card is connected to the video camera for photographing the image of the department to which the user belongs. The video camera for photographing the department is shared by other user terminals in the department.

The foregoing virtual proximity service enables a determination can appropriately be performed such that whether an interruption is made to perform a talk, whether waiting for the completion of the work of the companion is performed or whether the start of the talk is abandoned this time and postpone the talk, the determination being performed in accordance with the state of the companion or the circumstance of the user. As a result, the communication between adjacent persons can be simulated more accurately as compared with the conventional service, telephone and TV telephone.

The system according to this embodiment has the structure such that the image of the state of a certain department selected by a computer is displayed regardless of the intention of the user to perform communication in a state where each user is not operating the user terminal. Thus, each user is enabled to start communicating with a companion during seeing the companion displayed on the screen. Thus, unplanned communication between near persons as if the user comes on a person on a passage and starts a conversation can be realized with a remote person. Since the conventional method has the structure such that the image link is established randomly, the conventional method has not been an effective method when the companion is absent or the like. However, since the possibility where all members at companion side are not present is low, the system according to this embodiment has the structure such that the occurrence of unplanned conversation can be realized at a high possibility.

A more practical convenience can be realized by determining the other departments to be displayed in accordance with any criterion as compared with random determination. For example, a method may be employed in which the number of communication operations with each department is counted by the system to change the frequency of appearance of each department, the image of which is to be displayed, in accordance with the frequency of the communication or change of the same. In the foregoing case, it can be considered that a satisfactory effect can be obtained by, with policies applied, displaying the image of a department, with which a certain cooperative project has been performed and human relationship with which is intended to be maintained, or a department, with which the communication has not been performed frequently. Since the foregoing display of the image is performed during pause of the user operating the terminal, the operation of the terminal is not affected.

Actual communication operations in an office is not limited to the foregoing case where only the two persons have a talk. In actual, another person sometimes interrupts the conversation between the two persons to join the conversation, or another person waits for the calling at an adjacent position or another person gives up the idea of performing the conversation and returns to the seat. Thus, the communication to which three or more persons relate inevitably takes place. In the foregoing case, the mutual states are required to be determined more appropriately as compared with the communication between two persons.

The conventional service cannot perform a flexible service because an interruption, such as interruptive telephone, is performed without consideration of the state of the companion. When a conversation is performed among a multiplicity of places, the conventional service has been required to make a conference server reservation or a chairman is required to call each member. Thus, a spontaneous conversation among a multiplicity of persons such as proximity communication as is taken place in an actual office cannot be realized. The service according to this embodiment using the foregoing system realizes informal communication among a multiplicity of places.

The description will now be made about communication to be performed such that a person approaches two persons who are talking to each other. In communication which is performed in an office, if person A selects "APPROACH" toward person C at the time two persons B and C are talking to each other, persons B and C are able to detect the approach of person A. Moreover, person A is able to recognize that person C, to which person A intends to talk, is talking with person B. Accordingly, this system has a structure such that an image link is established between the terminals of persons A and C and between the terminals of persons A and B.

The display unit of person A displays a window showing the images of persons B and C who are talking to each other. On the other hand, the display unit of each of persons B and C displays the window of the companion with which talking is performed and the image of person A who is approaching person C.

Since the bi-directional image link is established, the state of the conversation of the companions can be recognized so that whether start of conversation is nuisance or not may be judged. If person A determines that start of conversation is permitted, person A selects "TALK". As a result, a voice link is established between the terminals of persons A and C and/or the terminals of persons A and B so that start of conversation is permitted without a necessity of waiting for the response of the companion.

If person A determines that the conversation is being continued without any interruption, person A waits for the companion starting conversation. In this case, "WAIT" is selected. As a matter of course, person A selects "TALK" in a case of urgency so that person A performs a conversation by connecting the voice link between the terminals of persons A and C. Since also person B is able to hear the contents of the conversation, person B is able to recognize interruption made by person A due to an urgent business. If the contents of the conversation is secret, a fact of a requirement for person B to be reserved is communicated with voice and urges person B to select "WAIT" or "END" so as to cut both of the image and voice links or only the voice link. Thus, a state where person B waits for end of the conversation between person A and person C is realized.

The description will now be performed about a case where communication is performed with a person which is not the person intended to have a talk initially. In actual communication in an office, there sometimes occurs a case where person A adjacent to person C starts talking with person B, who has approached to talk with person C because person C is busy. In this system, if person A selects "APPROACH" with respect to person B in a case where person B has selected "APPROACH" or "WAIT" to talk with person C, conversation between person B and person A is commenced because person B is not talking. In the foregoing case, person B selects "END" with respect to person C to cut the image link and person B selects "TALK" with respect to person A to establish the voice link.

With the conventional system, seeing of the companion results in the image of the user being displayed with respect to the companion. Therefore, an influence similar to ringing of a telephone set to call the companion is made upon the companion. However, the system according to this embodiment has a structure such that when the user intends to see the companion to designate the companion, the image of the department, to which the companion belongs, is displayed so that the fact that the department is being seen is communicated to all members in the department. Therefore, a problem of privacy can be solved and unintentional interruption of the work of the companion is prevented as has been interrupted by the ringing sound of the telephone when communication with the companion is commenced. Thus, a virtual proximity service more approximating actual proximity communication can be provided.

Although the conventional system has simulated the state of walking of a user in an office by setting a route for walking, previous setting of the route is not practical and, thus, the foregoing function has not been used. However, the system according to this embodiment enables information of relative sections defined as the approach objects or information of a person with which communication is performed to be selectively transmitted so that the user is able to arbitrarily walk among departments in the office logically positioned approximately. Thus, a simulation can be performed in which in a case where a companion is absent or the same is working when the user visits the department to which the companion belongs, the user completes the intended business with adjacent person or the user talks with a person who is accidentally visiting the department.

The conventional system having the structure such that the terminals are randomly connected to each other results in the connection being established unintentionally though the companion is absent or the same is talking with another person. Thus, unplanned communication cannot be simulated. However, in the system according to this embodiment image information of another department is presented at a time at which the user is not operating the terminal. Therefore, unplanned communication between near persons as if the user comes on a person on a passage and starts a conversation can be realized with a remote person.

Since the image link between the user and the companion can arbitrarily be suspended and established, the necessity of the image link with the companion of the conversation to be continuously connected can be eliminated. Moreover, the companion of the conversation can arbitrary be selected. In addition, a fact that the screen is possessed by image information in a state no conversation is required can be prevented. If the image link is maintained, the state where the conversation is permitted mutually can be recognized. Therefore, the communication can efficiently be performed as if an actual conversation with approach persons. Since the voice link is directly is established without ringing sound for calling a companion, a conversation can immediately be commenced as if the conversation is performed between adjacent persons.

Since information of the states of the companions and states of the conversion of the companions can easily be obtained when a conversation among three or more persons is performed, an appropriate determination can be performed whether the user interrupts the conversation between the companions or reserves from interruption. Thus, a flexible social protocol among approach persons can be realized.

As described above, the foregoing system has the structure such that the image of persons surrounding the companion is presented to the sender together with the image of the companion intended to be communicated. Therefore, even if the companion intended to be communicated is absent or holding a conversation and thus communication cannot be accepted, conversation with a person in the vicinity of the companion is enabled. Thus, communication state is realized on a network, the state being a state in which a user walks in an office sectioned into groups and visits a group to which the companion belongs.

However, the foregoing system having a shared image server for photographing the overall image of the group has a problem in that the range formed into a group is physically limited to a region which can be photographed by the camera of the image server. Therefore, persons existing physically apart from one another cannot be defined into the same group. Moreover, an image input unit is required to be provided for the image server for acquiring the image of the group. In addition, an image input unit is individually provided for each terminal when a TV conference is held. Thus, there arises a problem in that the units to be provided increases excessively.

A second embodiment arranged to be capable of solving the problem experienced with the first embodiment will now be described.

(Second Embodiment)

Figure 12:
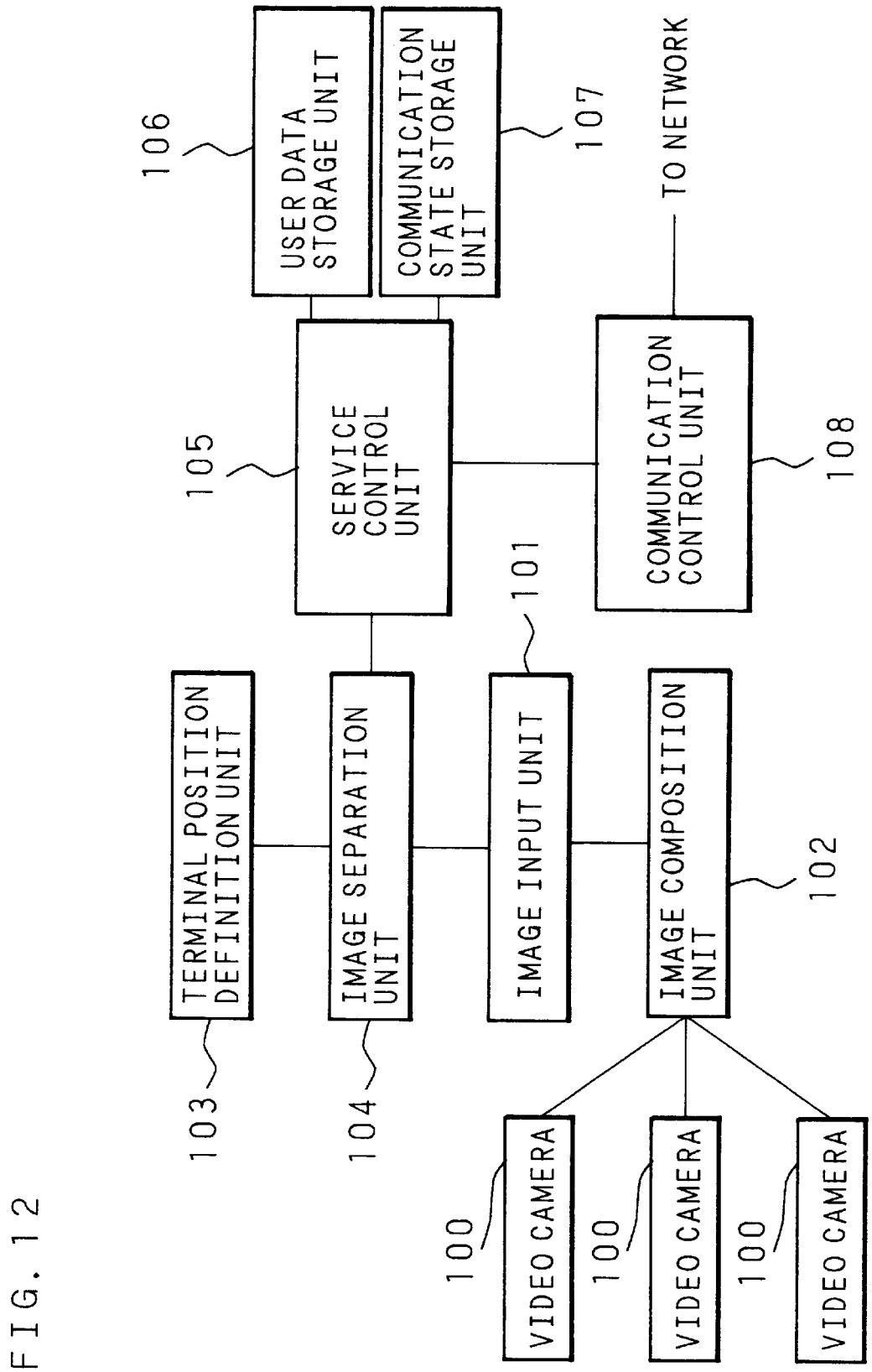
FIG. 12 is a diagram (a structural view of an image server) showing the principle of the second embodiment of the present invention.
Figure 13:
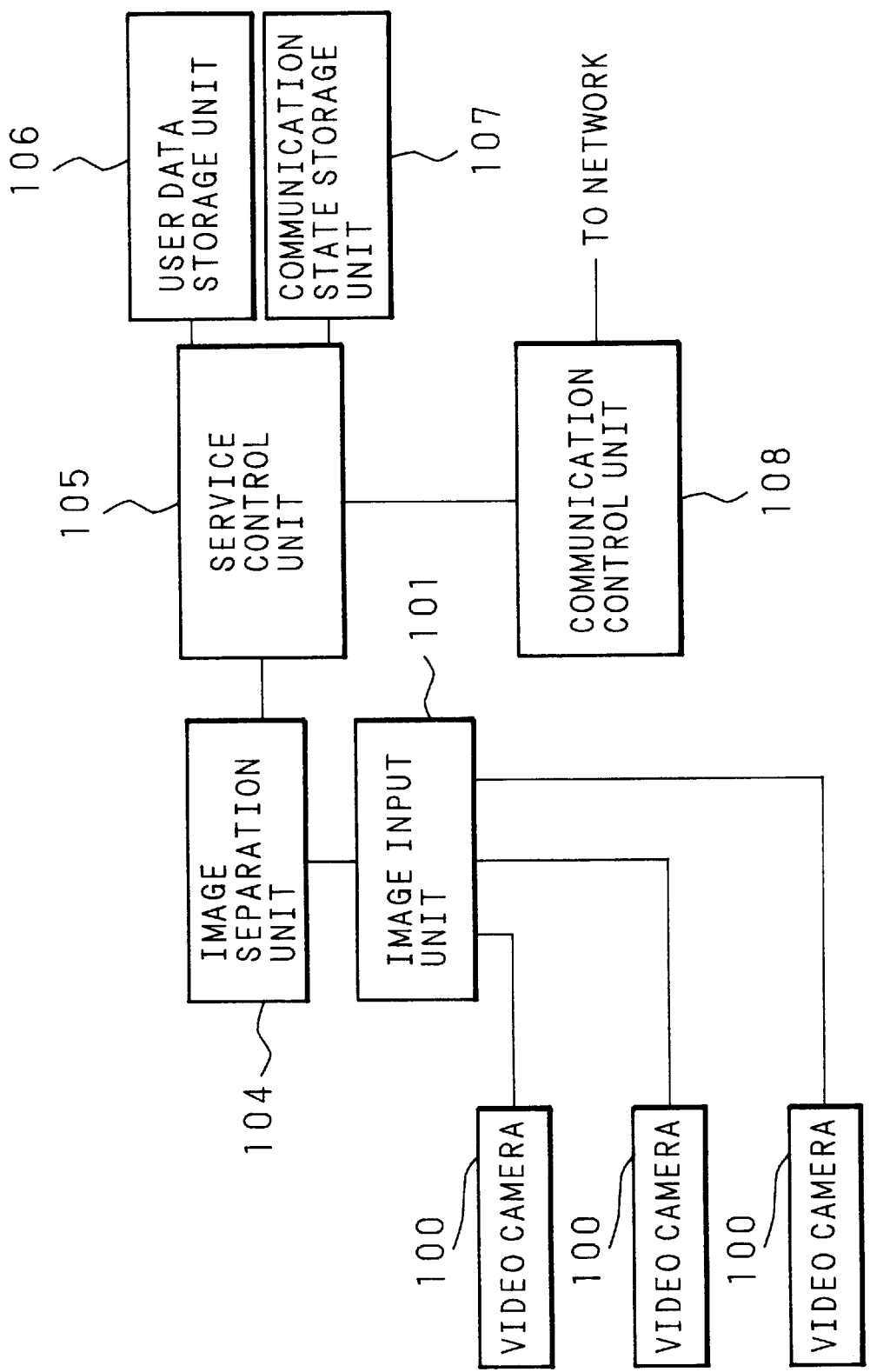
FIG. 13 is a diagram (a structural view of the image server) showing the principle of the second embodiment.
Figure 14:
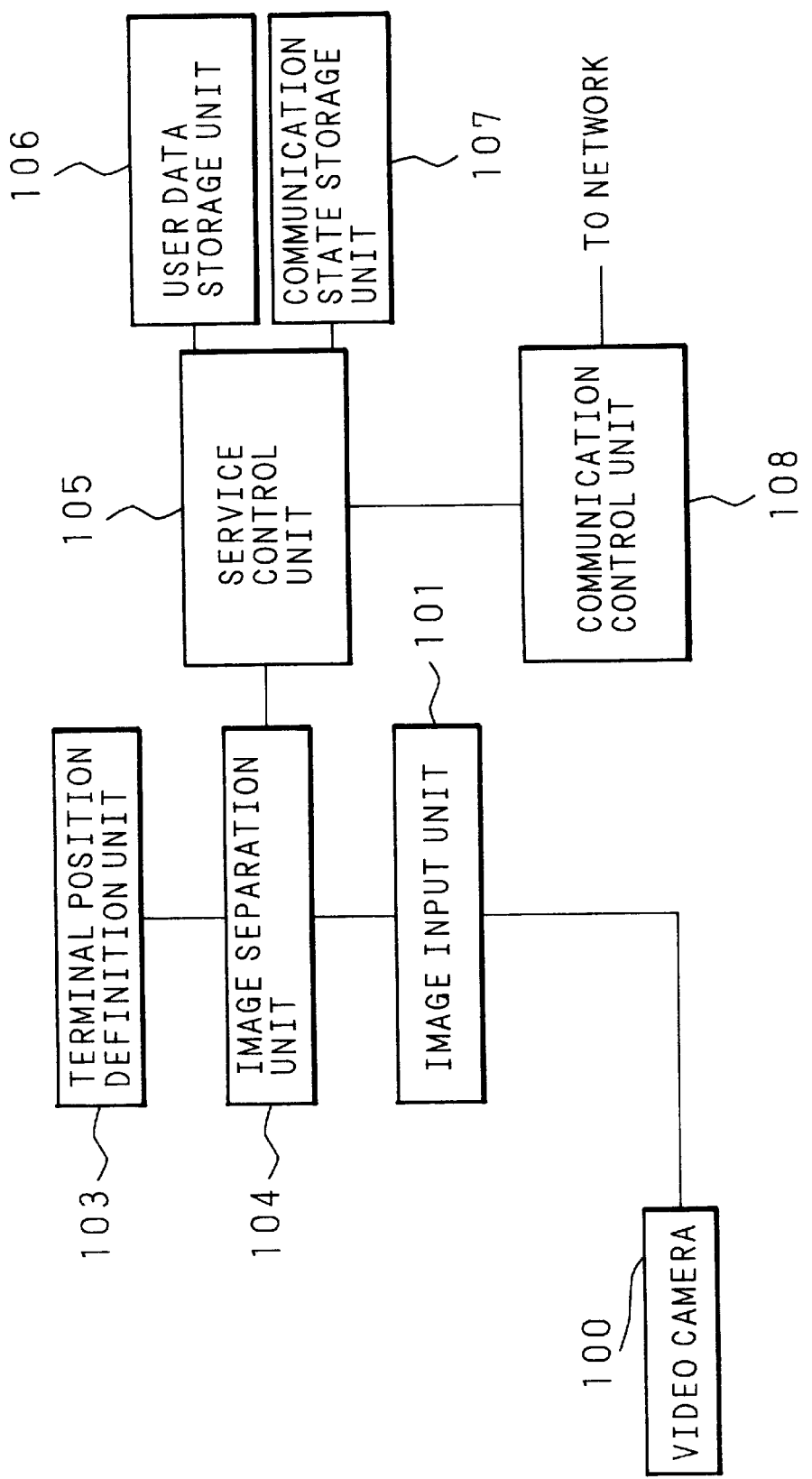
FIG. 14 is a diagram (a structural view of the image server) showing the principle of the second embodiment.
Figure 15:
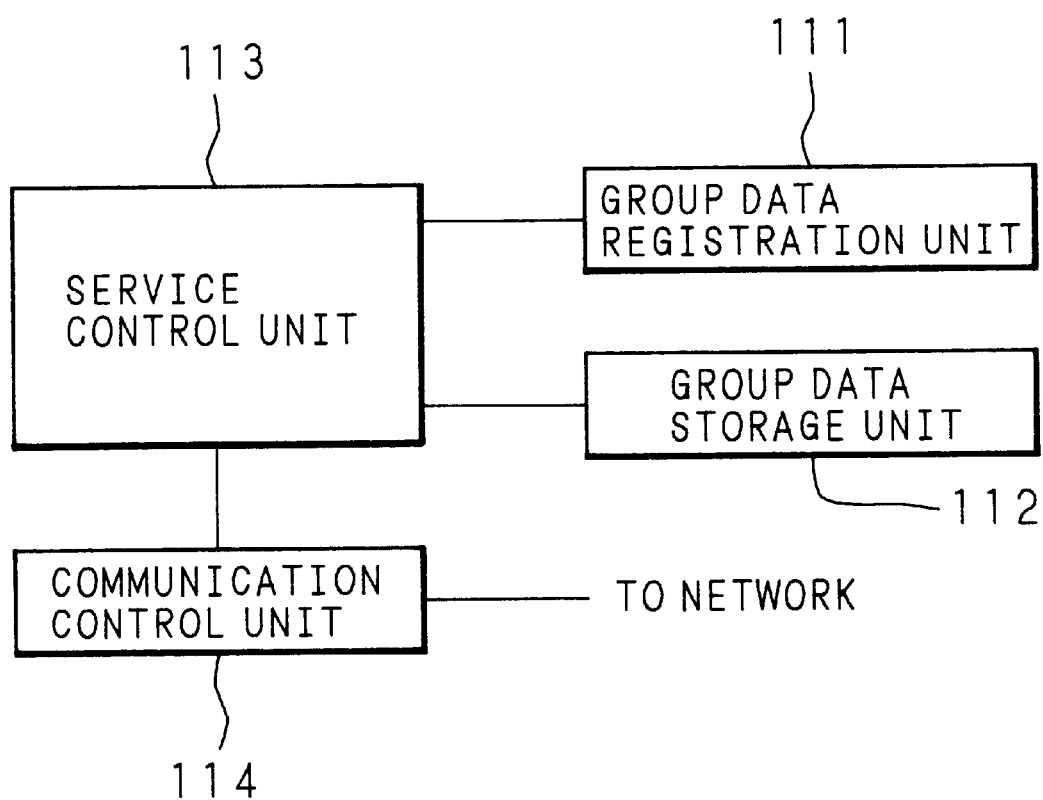
FIG. 15 is a diagram (a structural view of a group data control apparatus) showing the principle of the second embodiment.
Figure 16:
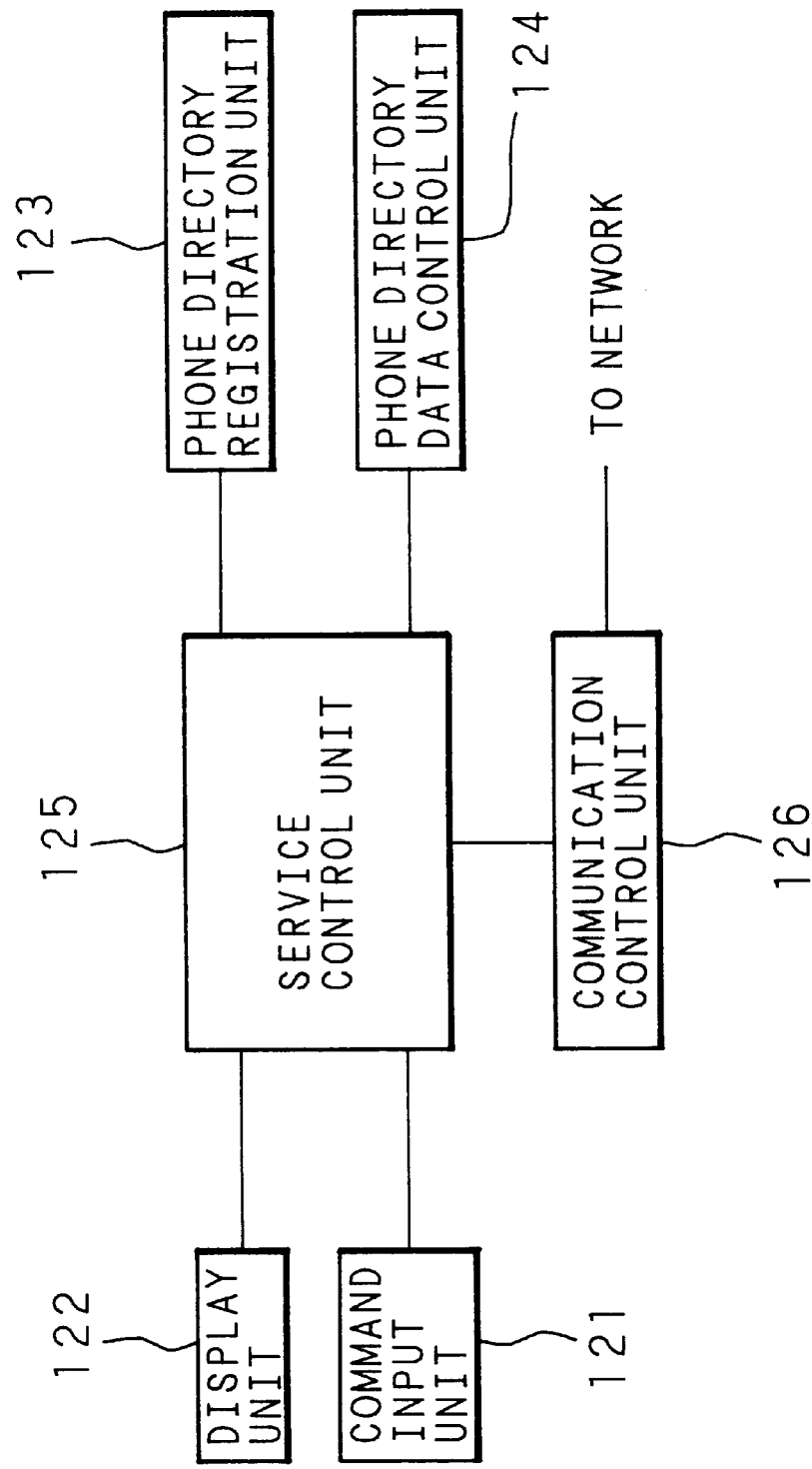
FIG. 16 is a diagram (a structural view of each user terminal) showing the principle of the second embodiment.

FIGS. 12 to 16 are principle drawings of the second embodiment. FIGS. 12 to 14 are structural views showing an image server shared by a plurality of user terminals. FIG. 15 is a structural view of a group data control apparatus for registering a plurality of users into groups to control the groups. FIG. 16 is a structural view of each user terminal.

As shown in FIG. 12, an image server includes an image composition unit 102 having ports for connecting a plurality of video cameras 100 for photographing the images of users, an image input unit 101 for receiving an output from the image composition unit 102, a terminal position definition unit 103 for defining the positions of the user terminals in the image, an image separation unit 104 for separating the image into an image for each user, a user data storage unit 106 for storing personal information of users, such as telephone numbers, a communication state storage unit 107 for storing state of the communication with the user terminal, a communication control unit 108 for communicating data through a communication line and a service control unit 105 for transmitting image data, user information, the communication state when required from the network.

The image composition unit 102 composes respective analog images photographed by the plural video cameras 100 into one analog image to transmit the analog image to the image input unit 101. The image input unit 101 converts an image signal into digital data. The terminal position definition unit 103 defines the positions of users in the image, while the image separation unit 104 reads out position information of users defined by the terminal position definition unit 103 to separate digital image data transmitted from the image input unit 101 into image data for each user. The communication control unit 108 communicates information through a communication line of the network. The service control unit 105 transmits image data of the required user to the user terminal through the communication control unit 108 to follow a requirement from the user terminal.

As a method of obtaining image data for each user, the following method may be employed as well as the foregoing method. FIG. 13 is a structural view of another example of the image server. An image input unit 101 has a plurality of input ports for simultaneously connecting video cameras 100 each of which is provided for each user. The image input unit 101 switches the input obtained at each input port thereof for each video camera 100 of the user so that image data of a demanded and required user is obtained. The foregoing switching operation is performed in accordance with a switching program supplied from an image separation unit 104.

FIG. 14 is a structural view showing another example of the image server. A video camera 100 capable of simultaneously photographing a plurality of users is provided. The positions of the users in the image photographed by the video camera 100 are defined by a terminal position definition unit 103. In accordance with position information of the users, image data of a demanded and required user is obtained by an image separation unit 104.

As shown in FIG. 15, the group data control apparatus includes, a group data registration unit 111, a group data storage unit 112, a service control unit 113 and a communication control unit 114. The group data registration unit 111 has a function capable of registering a plurality of users as a virtual group. The group data storage unit 112 stores registered group data. The group data item contains the name of the group, names of members belonging to the group and addresses of the image server shared by the user terminals of the respective members. The communication control unit 114 communicates information through the communication line of the network. The service control unit 113 reads out group data stored in the group data storage unit 112 to a demand made from a user terminal to transmit group data to the user terminal through the communication control unit 114.

As shown in FIG. 16, each user terminal includes a command input unit 121, a display unit 122, a phone directory registration unit 123, a phone directory data control unit 124, a service control unit 125 and a communication control unit 126. A required input from the user is received by the command input unit 121 and then transmitted to the service control unit 125. The display unit 122 is controlled by the service control unit 125 to display image information, the state of communication which is being performed by the companion of the communication. The phone directory registration unit 123 registers phone directory data defined by the user, while the phone directory data control unit 124 controls the registered phone directory data. The phone directory data item contains the group defined by the user, the name of the members belong to the group and the addresses of image server shared by the user terminals of the respective members. The communication control unit 126 communicates information through the communication line of the network. The service control unit 125 automatically receives registered group data from the group data control apparatus so as to, together with phone directory data, display the group data item on the user terminal through the display unit 122.

Figure 17:
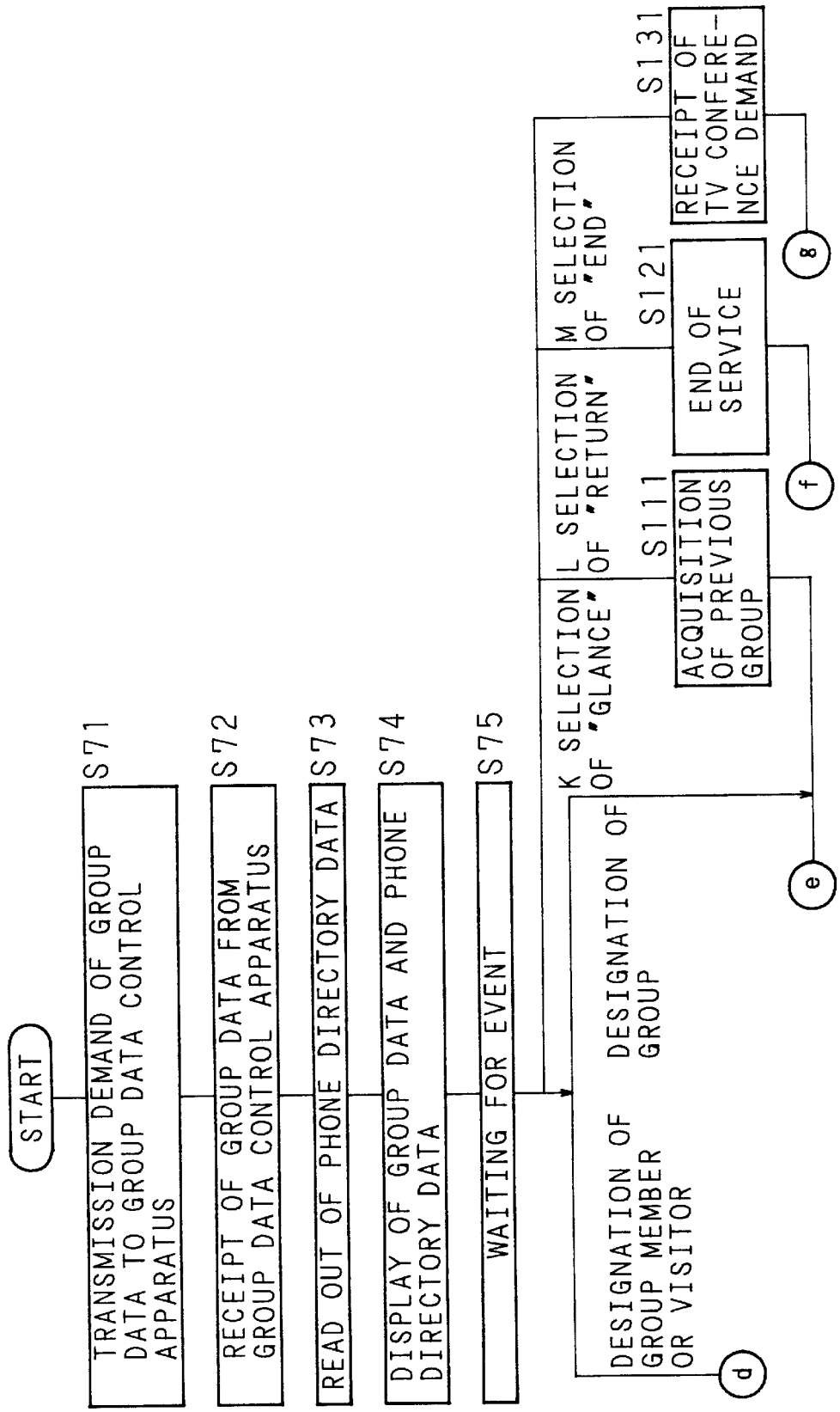
FIG. 17 is a flow chart showing the principle of the operation of the user terminal according to the second embodiment.
Figure 18:
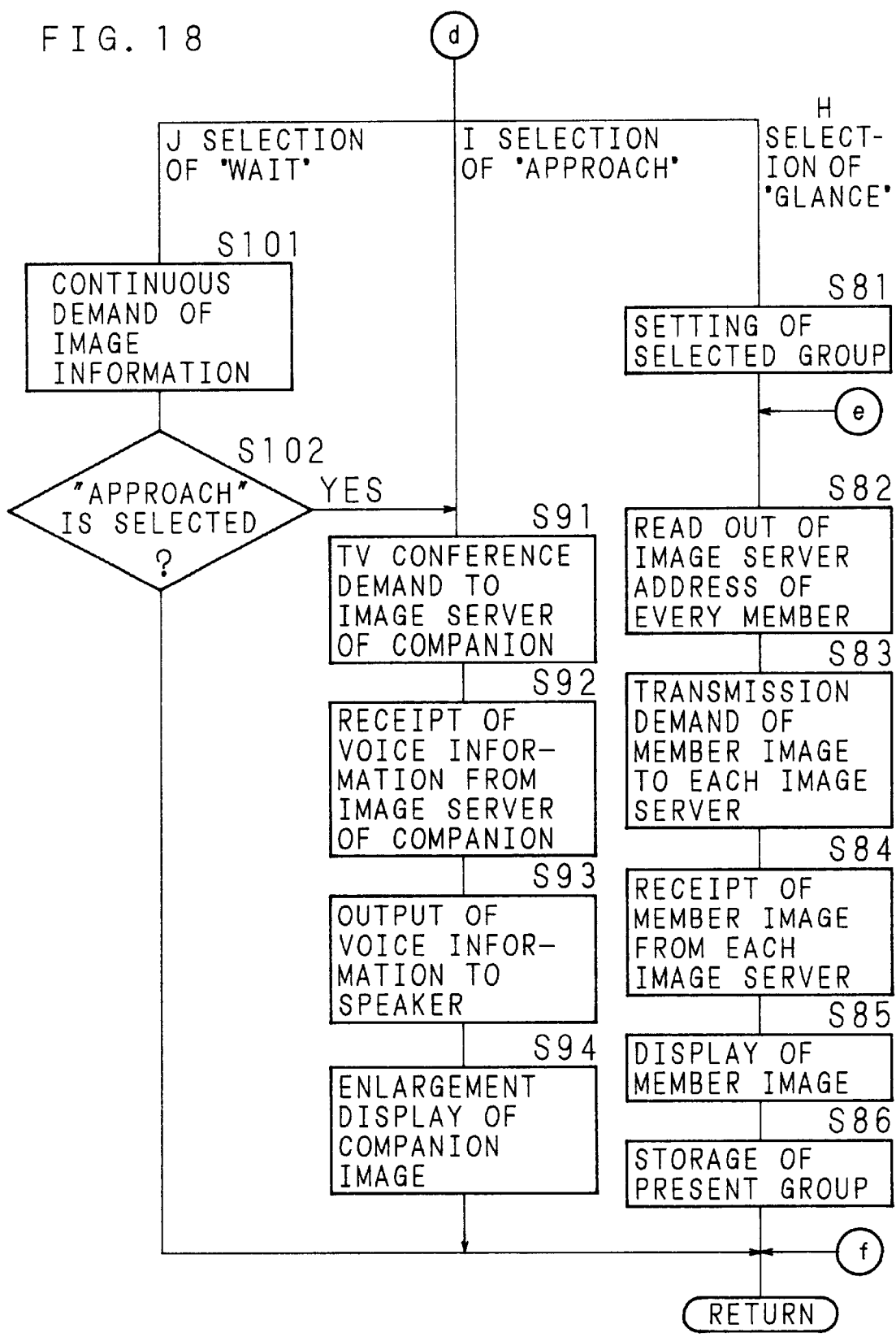
FIG. 18 is a flow chart showing the principle of the operation of the user terminal according to the second embodiment.
Figure 19:
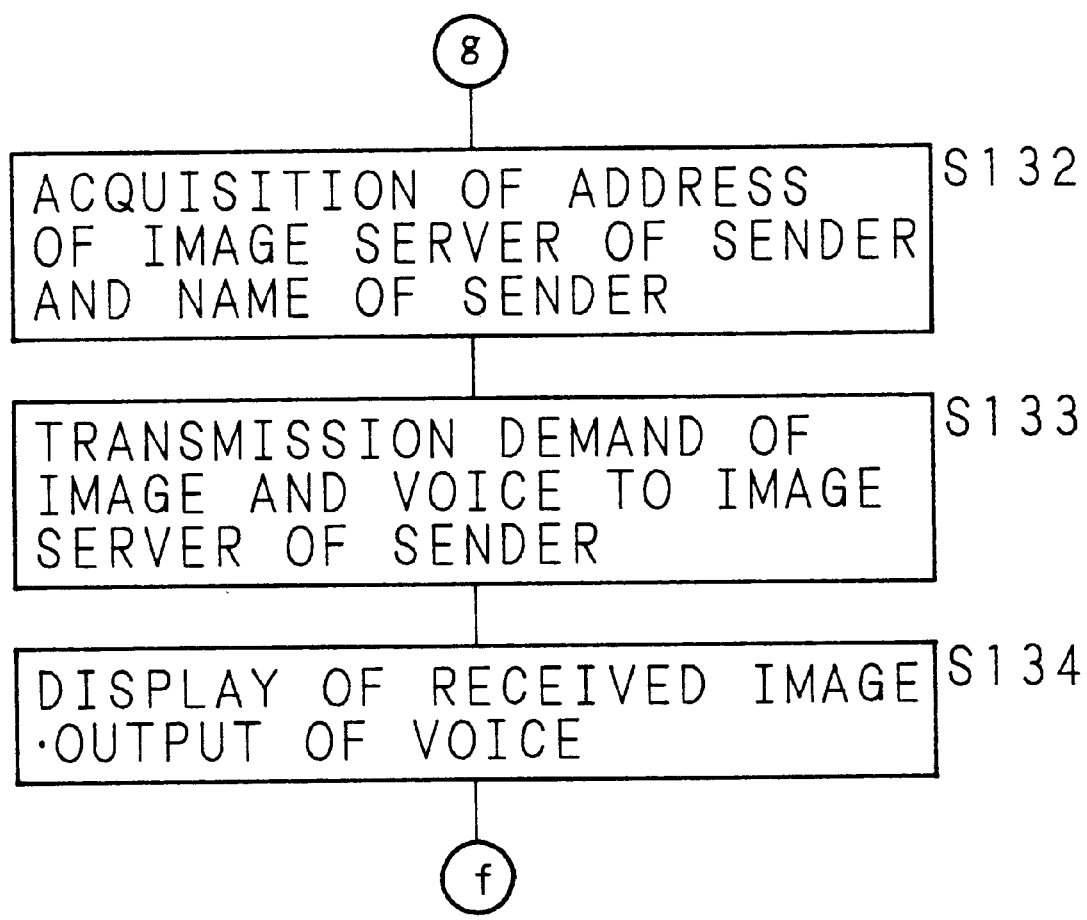
FIG. 19 is a flow chart showing the principle of the operation of the user terminal according to the second embodiment.
Figure 20:
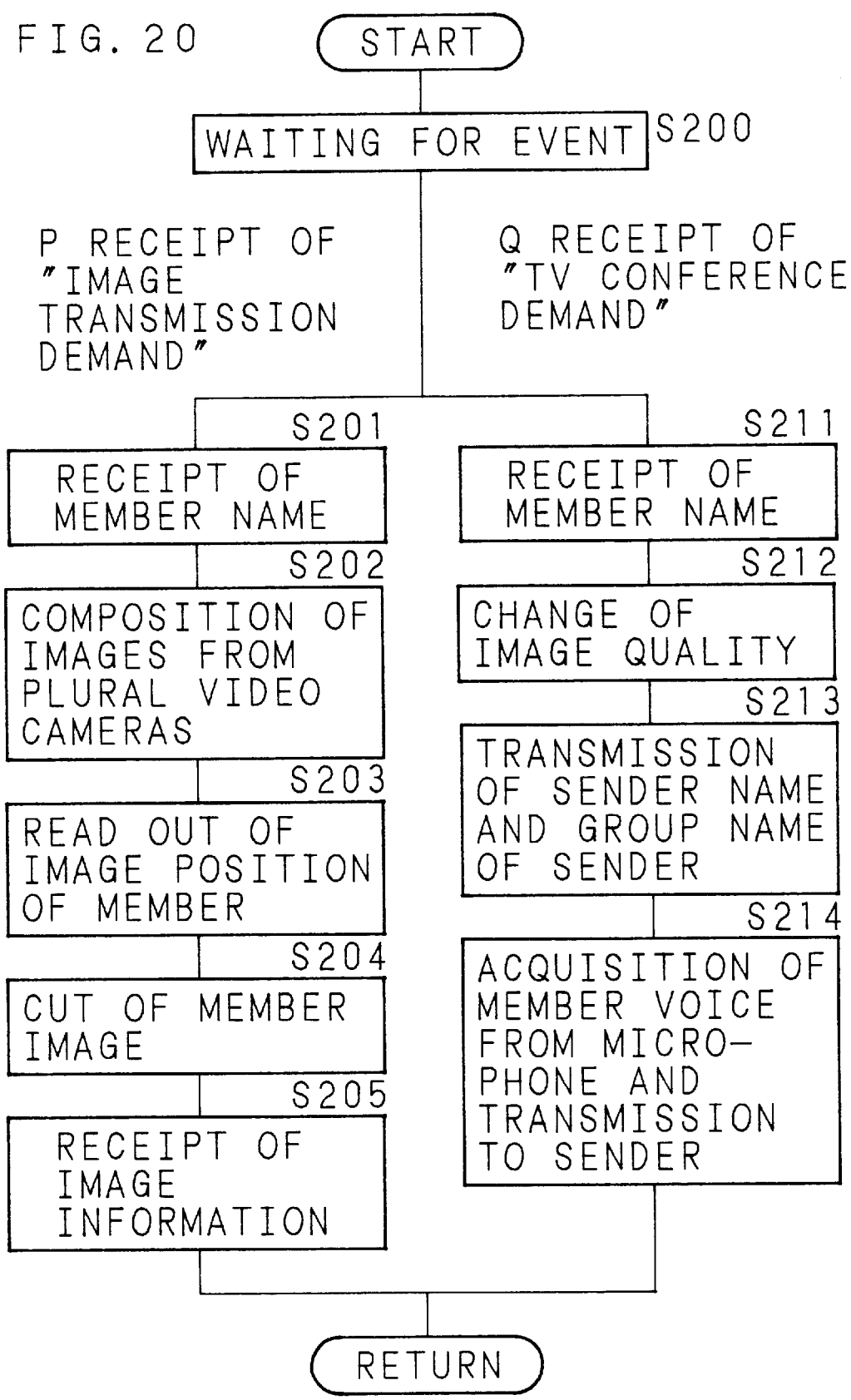
FIG. 20 is a flow chart showing the principle of the operation of the image server according to the second embodiment.
Figure 21:
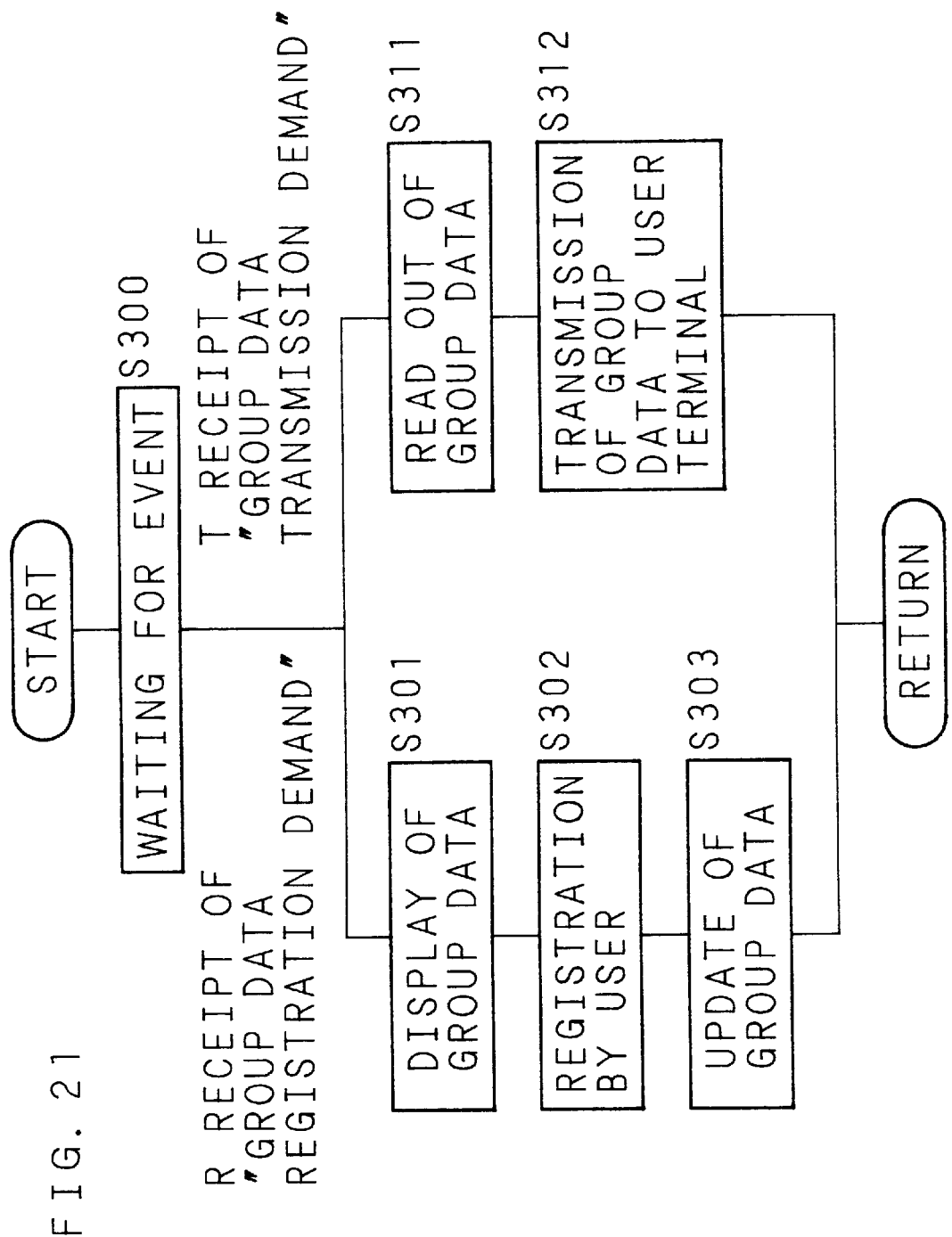
FIG. 21 is a flow chart showing the principle of the operation of the group data control apparatus according to the second embodiment.

FIGS. 17 to 21 are flow charts showing the principle of the operation of the second embodiment. FIGS. 17 to 19 show the principle of the operation of the user terminal, FIG. 20 shows the principle of the operation of the image server, and FIG. 21 shows the principle of the operation of the group data control apparatus.

When the user turns the communication application on the user terminal, a demand is issued to the group data control apparatus to transmit group data (step S71). Then, group data is received from the group data control apparatus (step S72) to read out phone directory data (step S73). Received group data and the read out phone directory data are displayed on the terminal (step S74) so that a state of waiting an event is realized (step S75).

Then, another user or a group intended to be communicated is designated, and then a required event is selected from the five events "GLANCE", "APPROACH", "RETURN", "WAIT" and "END". As a result of the foregoing designation and selection processes, the operation is branched into 6 routes H to M shown in FIGS. 17 and 18. The routes H, I and J are employed in a case where the member in the group or the visitor is designated or has been designated and "GLANCE", "APPROACH" or "WAIT" has been selected. The route K is employed in a case where the group has been designated and "GLANCE" has been selected. The routes L and M are selected when "RETURN" or "END" has been selected.

In a case where a companion intended to be communicated is intended to be observed, the sender designates the member, who is the companion, and selects "GLANCE" (the route H). When "GLANCE" has been selected, the group to which the member belongs is set to be the present group (step S81), and then the addresses of the image servers for all members in the group is read (step S82). In accordance with the addresses, a demand is made to each image server to supply image information of the members (step S83), and then image information is received from each image server (step S84). Then, the image corresponding to the received image information item is displayed on the screen of the terminal of the sender (step S85). Then, the name of the present group is stored (step S86), and then the operation is returned. As a result, the state of the designated companion can easily be confirmed.

In a case where an intention of the sender to perform a communication is intended to be communicated to the companion, the sender designates the companion, and then selects "APPROACH" (the route I). When "APPROACH" has been selected, a demand to perform a TV conference is issued to the image server of the companion (step S91). The image server of the companion transmits voice information picked up from the microphone of the terminal of the companion to the terminal of the sender. The terminal of the sender receives voice information (step S92), and outputs the same from the speaker (step S93), and the image of the companion is enlarged and displayed (step S94). On the other hand, when the terminal of the companion has received the demand for performing the TV conference (step S131), the terminal acquires the address of the image server of the sender and name of the sender from the terminal thereof (step S132). Then, the terminal demands the image server of the sender to transmit image information and voice information (step S133). Then, the terminal receives image information and voice information from the image server so that the image is displayed on the screen and voice is outputted from the speaker (step S134). As a result, the intention of the communication of the sender can be transmitted to the companion so that the TV conference is performed.

In a case where waiting is performed for a while due to absence of the companion or busy of the line of the companion, the sender selects "WAIT" (the route J). When "WAIT" has been selected, the demand is issued to all of the image server of the group to which the companion belongs to continuously supply the image. Then, image information is received so that the image is displayed on the terminal of the sender (step S101). Then, determination is performed whether or not "APPROACH" has been selected (step S102). If "APPROACH" has been selected, the operation proceeds to step S91 so that steps S91 to S94 are performed. Then, the operation is returned. If "APPROACH" is not selected, the operation is directly returned. As a result, waiting can be performed while observing the state of the companion.

When the sender has designated a group and selected "GLANCE" (the route K), the operation proceeds to step S82 so that steps S82 to S86 are performed. Then, the operation is returned. In a case where a member or a group, which has been designated, is intended to be again designated, the sender selects "RETURN" (the route L). If "RETURN" has been selected, the group stored previously is read out (step S111). Then, the operation proceeds to step S82 so that steps S82 to S86 are performed, and then the operation is returned.

When the service using the network is intended to be completed, "END" is selected (the route M). When "END" has been selected, all processes are completed such that all links are canceled (step S121). Then, the operation is returned.

Then, the operation of the image server will now be described with reference to a flow chart shown in FIG. 20. When the image server has been turned on, a state where event from the user terminal is waited for is realized (step S200). Then, "IMAGE TRANSMISSION DEMAND" or "TV CONFERENCE DEMAND" is received from the user terminal. Depending upon the even received, the route is branched to P or Q.

The case where "IMAGE TRANSMISSION DEMAND" is received is a route (the route P) when "GLANCE" is selected with the user terminal. In the case where "IMAGE TRANSMISSION DEMAND" has been transmitted from the user terminal, information of the member who has issued the image transmission demand is received from the user terminal (step S201). Images supplied from a plurality of video cameras are composed to form one image (step S202), and then coordinates of the members in the image are read out (step S203). The image of the subject member is separated from the image (step S204), and then image information corresponding to the separated image is transmitted to the user terminal (step S205). Then, the operation is returned.

The case where "TV CONFERENCE DEMAND" is received is a route (the route Q) when "APPROACH" is selected with the user terminal. When "TV CONFERENCE DEMAND" has been transmitted from the user terminal, information of the member required to perform the TV conference is received (step S211). The number of colors, resolution and transfer rate of the image to be transmitted are changed to enable high quality image to be transmitted (step S212). Moreover, name of the sender and name of the group are transmitted to the terminal of the member (step S213). Then, voice information is acquired from the microphone corresponding to the terminal of the member, and then voice information is transmitted to the terminal of the sender (step S214). Then, the operation is returned.

Then, the operation of the group data control apparatus will now be described with reference to a flow chart shown in FIG. 21. When the group data control apparatus has been turned on, a state where an event from the user terminal and the user is waited for is realized (step S300). Then, "GROUP DATA REGISTRATION DEMAND" from the user or "GROUP DATA TRANSMISSION DEMAND" from the user terminal is received. The event received determines whether the route R or route T is selected.

When the "GROUP DATA REGISTRATION DEMAND" has been received (the route R), group data, which has been registered, is displayed on the screen (step S301). The user registers displayed group data (step S302), and the group data control apparatus updates data (step S303). Then, the operation is returned. If "GROUP DATA TRANSMISSION DEMAND" has been received from the user terminal (the route T), group data, which has been registered, is read out (step S311), and then read group data is transmitted to the user terminal (step S312).

Figure 22:
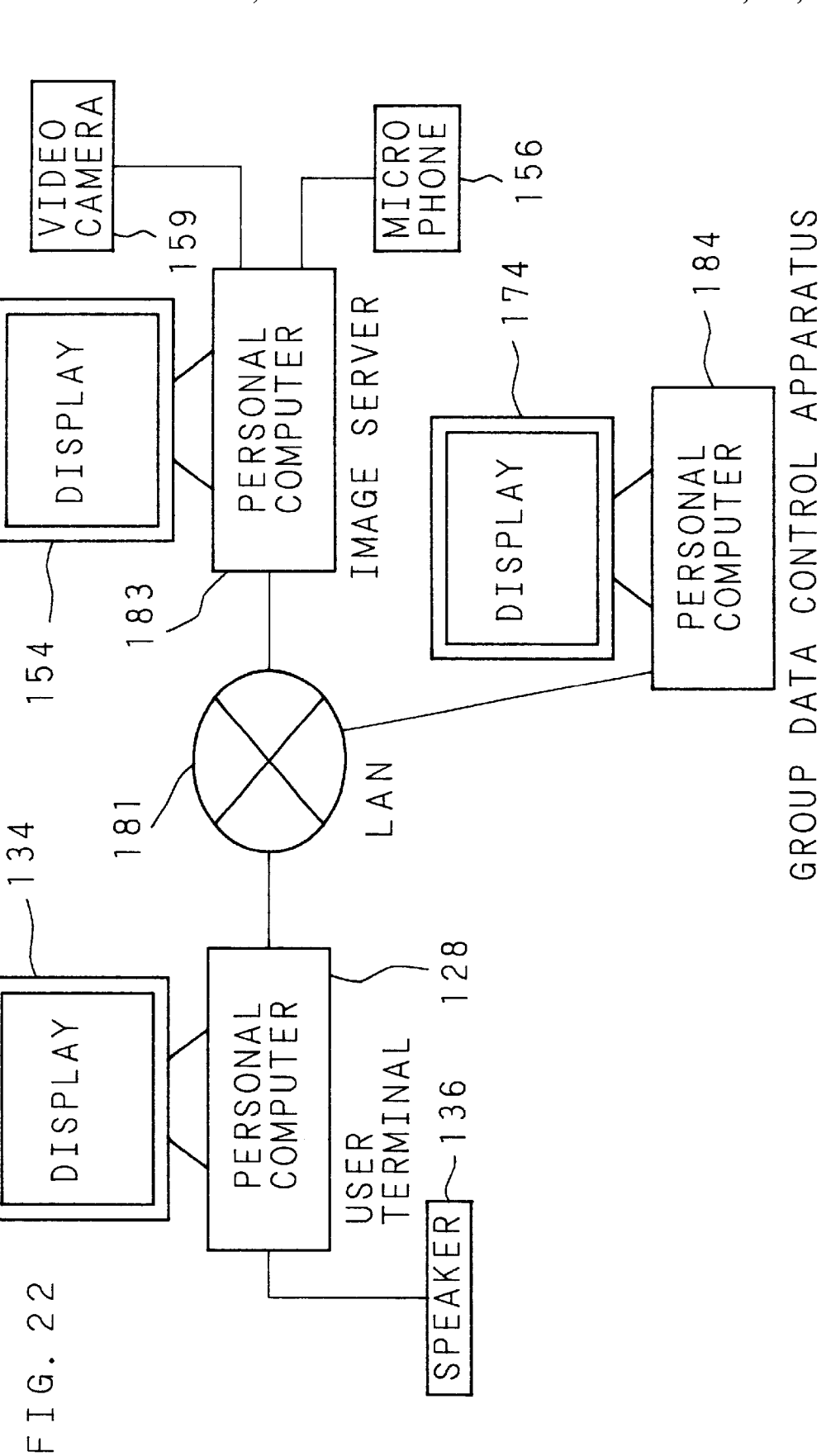
FIG. 22 is a diagram showing an example of the structure of the system according to the second embodiment.

FIG. 22 is a diagram showing an example of the system structure of the communication terminal according to the second embodiment. Referring to FIG. 22, reference numeral 181 represents a LAN. User terminals assigned to respective members in the office, an image server shared by a plurality of user terminals and a group data control apparatus are connected to the LAN 181.

Figure 23:
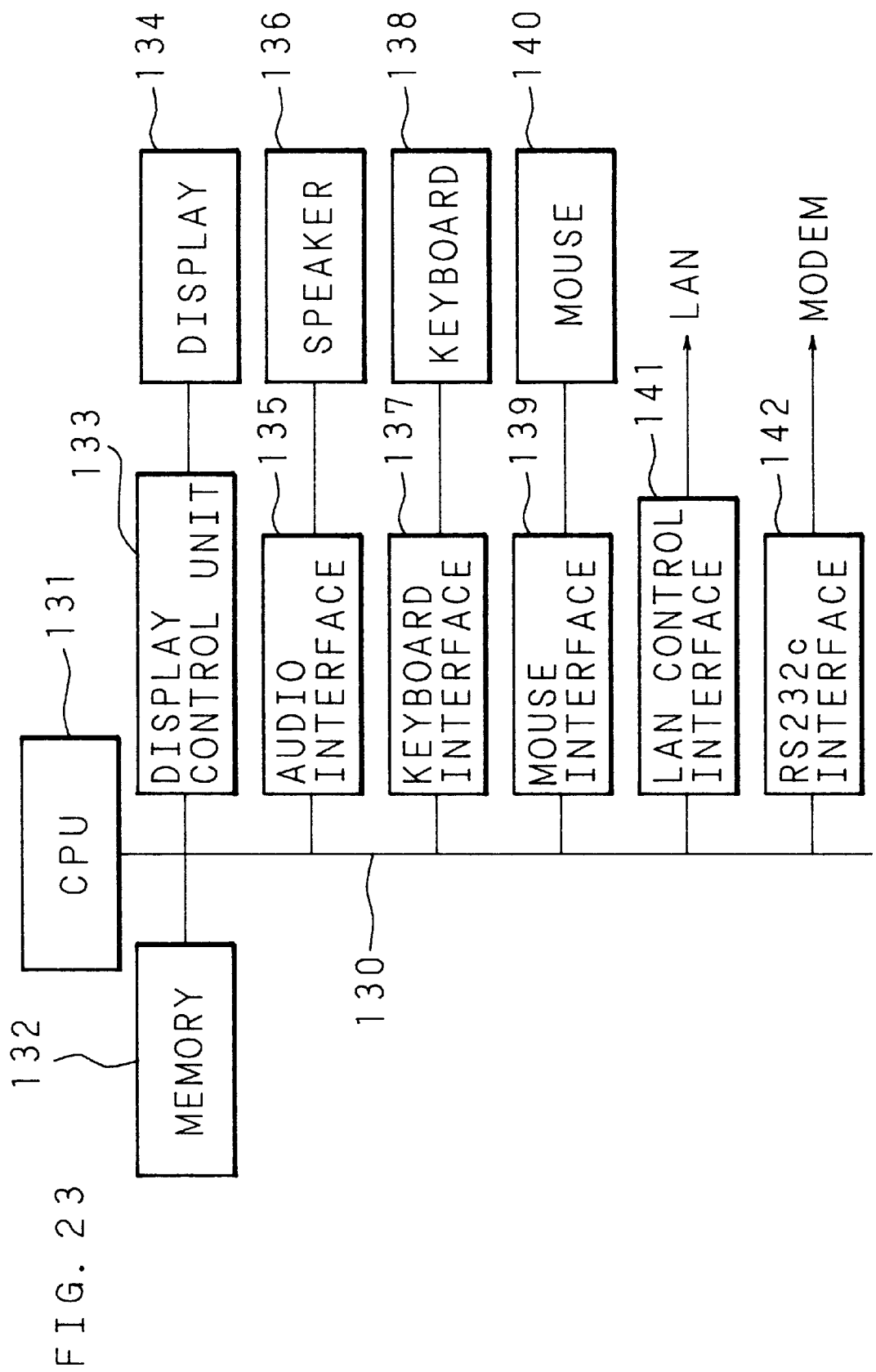
FIG. 23 is a block diagram showing an example of the structure of the system of the user terminal according to the second embodiment.

The user terminal has a personal computer 128, a display 134 for displaying information received through the LAN 181, a speaker 136 and so forth. FIG. 23 is a block diagram showing an example of the system structure of the user terminal. Referring to FIG. 23, reference numeral 130 represents a data bus. A CPU 131 for controlling the operation and a memory 132 serving as a storage unit for storing various information items are connected to the data bus 130. The display 134 is connected to the data bus 130 through a display control unit 133, the speaker 136 is connected to the same through an audio interface 135, a keyboard 138 is connected to the same through a keyboard interface 137, and a mouse 140 is connected to the same through a mouse interface 139. A LAN control interface 141 connected to the LAN 181 and an RS232c interface 142 connected to a modem (not shown) are connected to the data bus 130.

Figure 24:
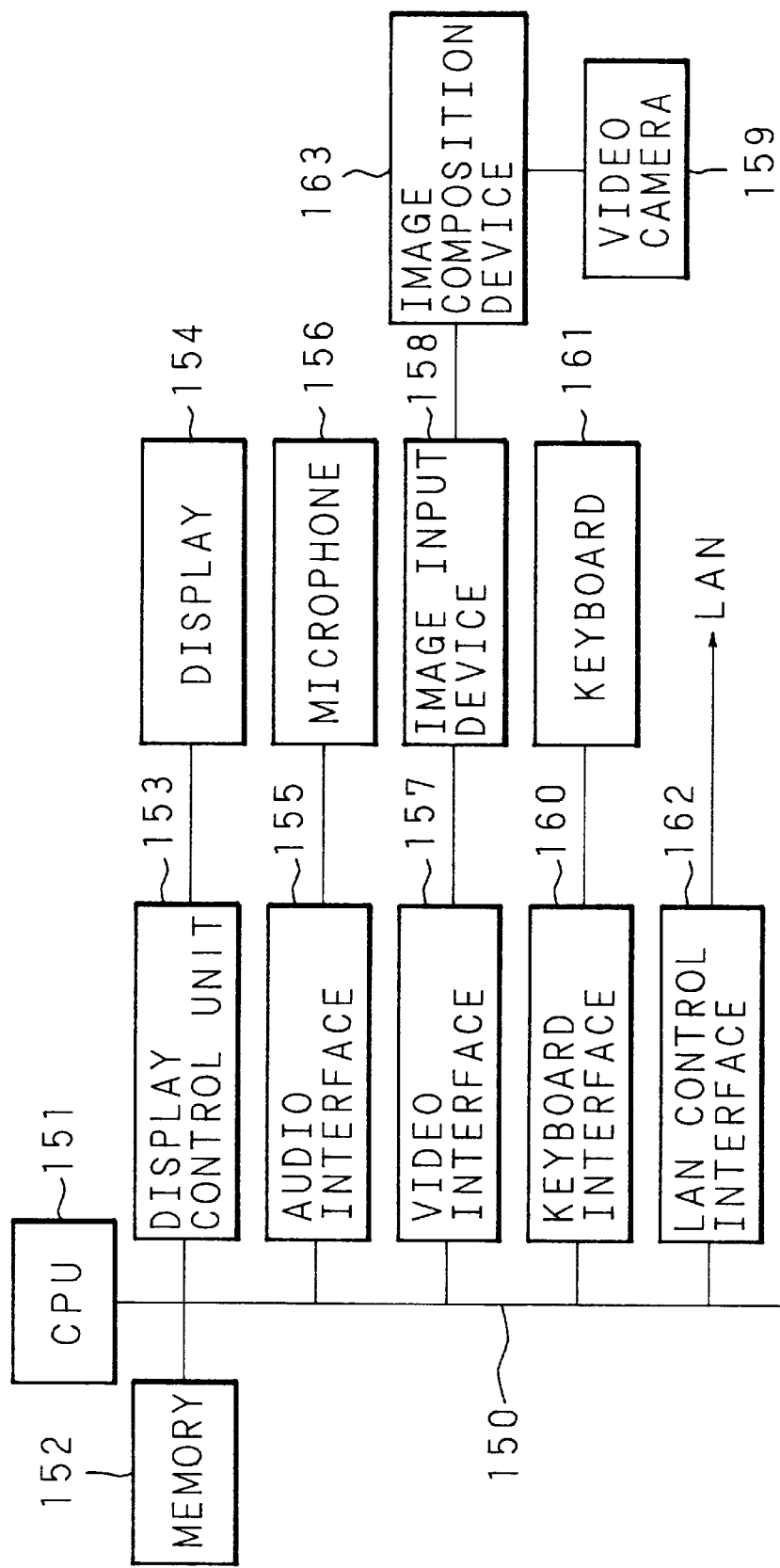
FIG. 24 is a block diagram showing an example of the structure of the system of the image server according to the second embodiment.

The image server has, a personal computer 183, a display 154 for displaying information of users received through the LAN 181, a video camera 159 for acquire the image of the user and a microphone 156. FIG. 24 is a block diagram showing an example of the system structure of the image server. Referring to FIG. 24, reference numeral 150 represents a data bus. A CPU 151 for controlling the operation and a memory 152 serving as a storage unit for storing various data items are connected to the data bus 150. The display 154 is connected to the data bus 150 through a display control unit 153, the microphone 156 is connected to the same through an audio interface 155, and a keyboard 161 is connected to the same through a keyboard interface 160. A series system consisting of an image input device 158, an image composition device 163 and the video camera 159 are connected to the data bus 150 through a video interface 157. A LAN control interface 162 connected to the LAN 181 is connected to the data bus 150.

Figure 25:
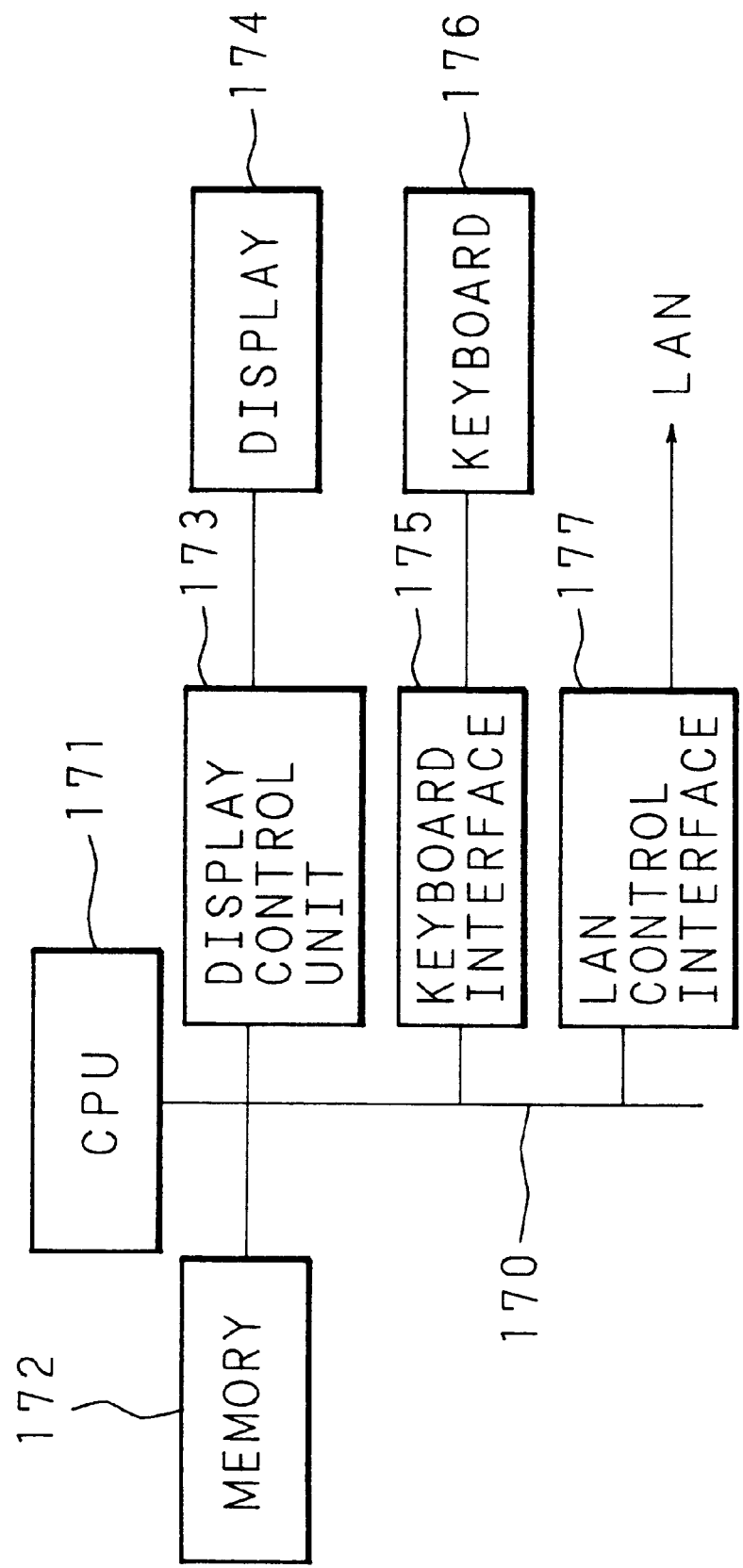
FIG. 25 is a block diagram showing an example of the structure of the system of the group data control apparatus according to the second embodiment.

The group data control apparatus has a personal computer 184 and a display 174 for displaying information received through the LAN 181. FIG. 25 is a block diagram showing an example of the system structure of the group data control apparatus. Referring to FIG. 25, reference numeral 170 represents a data bus. A CPU 171 for controlling the operation and a memory 172 serving as a storage unit for storing various information items are connected to the data bus 170. The display 174 is connected to the data bus 170 through a display control unit 173 and a keyboard 176 is connected to the same through a keyboard interface 175. A LAN control interface 177 connected to the LAN 181 is connected to the data bus 170.

The systems shown in FIGS. 23 and 25 are systems of a type employed in a general multimedia personal computer. The system shown in FIG. 24 has, in addition to a usual multimedia personal computer, an image composition unit for composing images picked up by a plurality of video cameras into one image.

Referring to examples of data and screens shown in FIGS. 26 to 31, the flow of the service and control according to the second embodiment will now be described.

Figure 26:
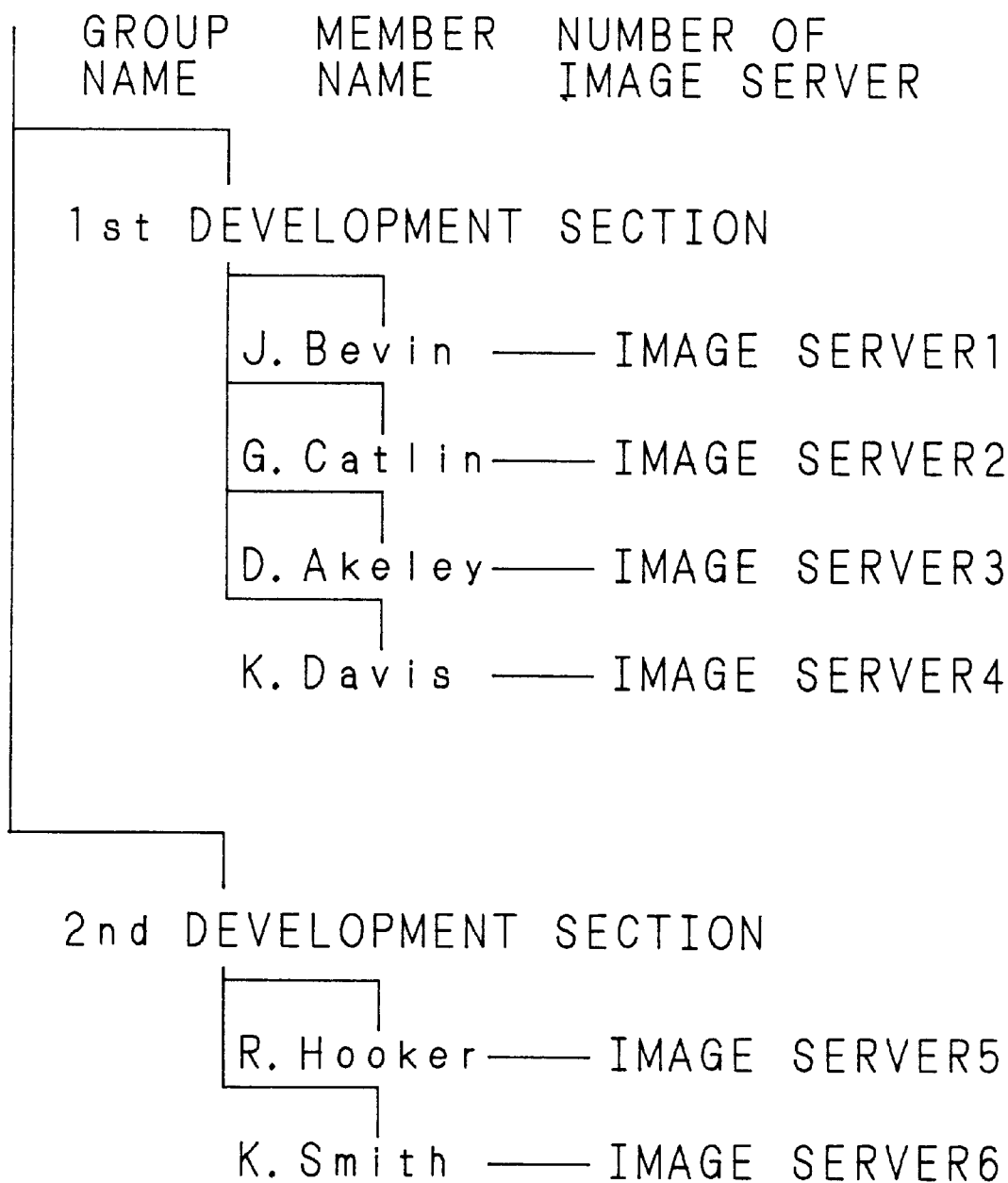
FIG. 26 is a diagram showing group data registered to the group data control apparatus according to the second embodiment.

FIG. 26 shows an example of group data registered to the group data control apparatus. The data item contains registered name of the group, names of members belonging to the group and numbers of image servers shared by the members. For example, facts that J. Bevin belongs to First Development Section and the image server for controlling the video camera for photographing J. Bevin is image server 1 are registered.

FIG. 27 shows an example of phone directory data defined by the user on the terminal thereof. Phone directory data above has a data format similar to the group data item for use in the group data control apparatus and contains names of groups, names of members belonging to each group and numbers of image servers each shared by the members. For example, facts that V. Nelson belongs to First Laboratory and the image server for controlling the video camera for photographing V. Nelson is image server 7 are registered.

When the user turns on the service on the terminal thereof, group data is automatically received from the group data control apparatus, and then group data is, together with phone directory data stored in the terminal, displayed on the screen. FIG. 28 shows an initial screen in the foregoing state. Referring to FIG. 28, two upper data items (First Development Section and Second Development Section) in Group Name are group data items received from the group data control apparatus. Two lower data items (First Laboratory and Second Laboratory) are phone directory data items stored in the terminal. Note that as the names of the members, four selected names in First Development Section are displayed.

When the user designates a group or a member on the screen and selects "GLANCE", the user is able to visit the designated group or a group to which the designated member belongs. For example, when J. Bevin in First Development Section has been designated in the state shown in FIG. 28 and "GLANCE" has been selected, image information of each of J. Bevin, G. Catlin, D. Akeley and K. Davis is received from the image servers. Image servers 1, 2, 3 and 4 correspond to the foregoing members, respectively. A demand to transmit image information of J. Bevin is issued to the image server 1, and demands to transmit image information of G. Catlin, D. Akeley and K. Davis are issued to the image servers 2, 3 and 4, respectively.

Figure 29:
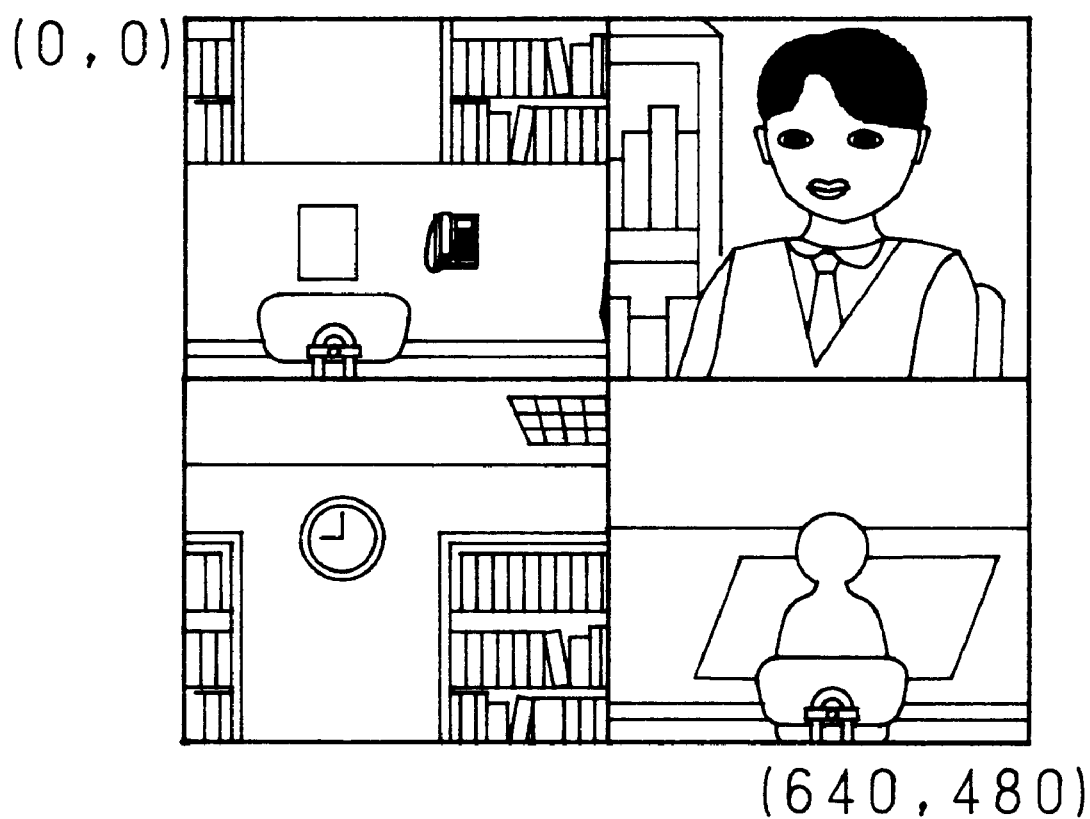
FIG. 29 is a diagram showing an example of a composed image in the image server according to the second embodiment.

FIG. 29 shows an image formed such that images obtained by a plurality of video cameras are composed by the image composition device 163 and the composed image is formed into a digital image by the image input device 158. The image is in the form having a horizontal width of 640 dots and a longitudinal width of 480 dots. FIG. 30 shows the coordinate information registered to the image server 1. It can be understood from the coordinates of O. Jewett that registered coordinate information is data having a horizontal width of 160 dots and a longitudinal width of 120 dots. Therefore, the coordinates in the coordinate information are multiplied by four to be adaptable to the actual image data size. As a result, the coordinates of the image of J. Bevin are (320, 0)–(640, 240). Therefore, image information of (320, 0)–(640, 240) is transmitted to the user terminal.

Figure 31:
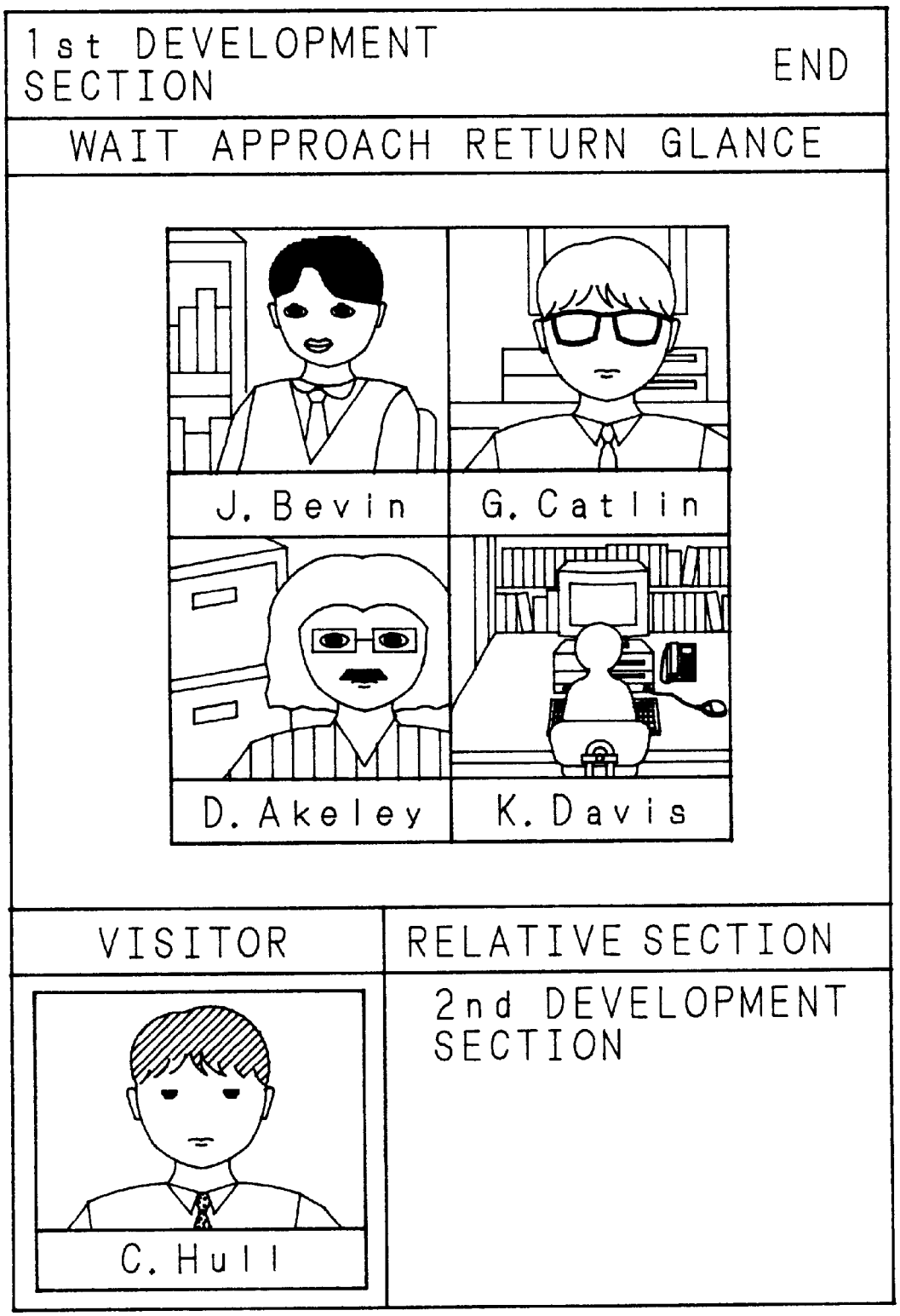
FIG. 31 is a diagram showing an example of a displayed screen of the user terminal according to the second embodiment.

An example of the screen formed when, for example, a user visits First Development Section is shown in FIG. 31. In a case where J. Bevin intended to be communicated exists and he is able to perform conversation, the companion is designated and "APPROACH" is selected so that bi-directional TV conference communication with J. Bevin is performed. If J. Bevin is absent, "WAIT" is selected on the sender side so that the image is continuously acquired from the image server and the image is displayed. As a result, a state can be simulated in which the user waits the companion at the place which was visited by the user.

The visited screen displays a visitor except the user (C. Hull in the example shown in FIG. 31). By designating the foregoing visitor and by selecting "APPROACH", the image of the foregoing visitor can be taken by cutting so that a TV conference with the person is performed. By selecting the relative section and by selecting "GLANCE", the user is able to visit the section.

The virtual proximity service according to the first embodiment requires the group (the department) to which the companion belongs and the group (the department) covered by the shared image server to be the same. Therefore, remote persons cannot be registered as the members in the same group. However, the second embodiment, having the structure such that group data is stored in the group data control apparatus and a required image is, by cutting, obtained from the plural image servers to transmit the image, a virtual group can be defined.

In a case where a TV conference is held after the user has visited a group (a department), the necessity of individually turning on the hardware and software for the TV conference can be eliminated. The TV conference can be held by using the image server so that a process from visiting of a group (a department) to performing a conversation is performed more smoothly. Since the hardware for the TV conference is required to be provided for only the image server, the cost can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A virtual proximity service control system using multimedia communication configured for holding a conversation while seeing the face of a communication companion and performing an image process, comprising:

group defining means for defining a plurality of users as a group;

first image input means, shared by a plurality of terminals, for photographing the overall image of a group;

second image input means for inputting the image of a user of one of the terminals;

image display means for displaying the image;

voice input means for inputting voice of the user of the terminal;

voice output means for outputting voice of the user of the terminal;

communication control means for communicating the image and voice through a communication line;

command input means for receiving any one of commands "GLANCE", "APPROACH" and "TALK"; and service control means for controlling image link and voice link to satisfy a demand from the user, wherein a conversation is allowed to start by a first step of connecting a first image link for communicating the image of a first terminal and the image of a remote group to which a communication companion as a receiver designated by a command "GLANCE" belongs, said remote group being defined by the communication companion as the receiver, between a user as a sender of the first terminal and terminals of said remote group, to follow the command "GLANCE" from the user of the first terminal, a second step of connecting a second image link for communicating the image of the first terminal and the image of a second terminal of any one of the users in said remote group designated by a command "APPROACH", between the user of the first terminal and the communication companion as the receiver of the second terminal, to follow the command "APPROACH" from the user of the first terminal, and a third step of connecting a voice link in addition to the second image link connected in the second step to follow a demand "TALK" from the user of the first terminal or the second terminal.

2. A virtual proximity service control system according to claim 1, wherein when a user of the first terminal designates the second terminal and inputs "APPROACH" in the first step and the second or the third step is formed between the second terminal and one or a plurality of third terminals, the second image link is connected between the first terminal and the second and the third terminals.

3. A virtual proximity service control system according to claim 2, wherein when any user of the first, second and third terminals inputs "TALK" and the second step is formed between the second and third terminals, the voice link is connected, in addition to the second image link, between the first, second and third terminals.

4. A virtual proximity service control system performing mutual conversation between users by using a communication network to which a communication terminal assigned to each user is connected, comprising:

a plurality of communication terminals each of which has play means, voice output means, voice input means, command input means for receiving a conversation demand and a conversation start demand in which a conversation companion is made to be a parameter, and communication control means for transferring image, voice and information between communication terminals;

group definition means for defining a plurality of users as being in one of a plurality of defined work groups;

a plurality of image input means each of which is assigned to each defined work group and inputs an image of a plurality of users defined as being in the same defined work group; and group data control means for controlling each user in one of the defined work groups, addresses of the plurality of communication terminals and addresses of the plurality of image input means, wherein on the basis of a receipt of a conversation demand of a sender by said command input means, said image input means for inputting an image of one of the defined work groups including a conversation companion as a receiver, is designated by a conversation demand specified by said group data control means, wherein one of the defined groups including the conversation companion as the receiver, is defined by the conversation companion and an image obtained by said image input means or a group information including names of users belonging to the defined group and addresses of communication terminals belonging thereto are transferred to said display means of a communication terminal of the sender by said communication control means and after an image is displayed on said display means of the sender communication terminal of the sender, on the basis of a receipt of a conversation start demand of the sender by said command input means, a voice link is connected by said communication control means, voice output means and voice input means between the communication terminal of the sender and a communication terminal of the conversation companion as the receiver designated by the conversation demand or a communication terminal of a conversation companion as the receiver selected from a group information transferred as a parameter at the time of the conversation start demand.

5. A virtual proximity service control system according to claim 4, further comprising:

at least any one of group voice input means for inputting voice information of one of the defined groups, sensor means for detecting presence/non-presence of each user in one of the defined groups, and communication state control means for controlling a communication state of each user of one of the defined groups including a state where a conversation demand is received and an image is being transferred and a group name of a transferring side, and including a state where a conversation start demand is received and conversation is being performed and an information of the conversation companion as the receiver, wherein on basis of a receipt of a conversation demand of the sender by said command input means, an information obtained from said group voice input means, at least sensor means or communication state control means is transferred to said display means of a communication terminal of the sender by said communication control means.

6. A virtual proximity service control system according to claim 5, wherein a conversation demand and a conversation start demand are issued by making a name of a third group of an image transferring side or a third conversation companion as a receiver under conversation by a parameter, in a communication state of each user obtained from said communication state control means.

7. A virtual proximity service control system according to claim 5, wherein a voice link is connected by said communication control means voice output means and voice input means between communication terminals of a sender, a user under conversation and a third conversation companion as a receiver, by receiving a conversation start demand toward the user under conversation or the third conversation companion as the receiver under conversation obtained by said communication state control means.

8. A virtual proximity service control system according to claim 5, wherein said communication state control means also controls an address and a user's name of a third communication terminal which is issuing a conversation demand, toward one of the defined groups of said image input means; and in addition to an image by said image input means, at least one of information mentioned in the following is transferred to a communication terminal which has issued a conversation demand, information of the address and the user's name of said third communication terminal, information of an image obtained by image input means of said third communication terminal on the basis of the address of said third communication terminal, and information obtained from group voice input means, at least sensor means or communication state control means of one of the defined groups including said third communication terminal.

9. A virtual proximity service control system according to claim 8, wherein said third communication terminal has second image input means for inputting an image of a user himself, and transfers an image of a user himself inputted by second image input means of said third communication terminal to a communication terminal which has issued a conversation demand, instead of an image of a group including said third communication terminal.

10. A virtual proximity service control system according to claim 8, wherein a conversation demand and a conversation start demand can be received, concerning an address and a user's name of said third communication terminal.

11. A virtual proximity service control system according to claim 5, further comprising:

group informing means for informing an address and a user's name of at least a sender communication terminal or information obtained from image input means, group voice input means, at least sensor means or communication state control means of one of the defined groups of a communication terminal of the sender to one of the defined groups including a designated conversation companion as a receiver and defined by said group definition means or to each user of a one of the defined groups, when an image obtained by said image input means of one of the defined groups including a designated conversation companion as a receiver and defined by said group definition means or one of the defined groups is transferred, on the basis of a receipt of a conversation demand of the sender by said command input means.

12. A virtual proximity service control system according to claim 11, wherein said communication terminal of the sender has second image input means for inputting an image of a user himself, and transfers an image of a user himself inputted by said sender second image input means to a group including a designated conversation companion as a receiver and defined by said group definition means or to each user of a designated group, instead of an image of a group including said communication terminal of the sender.

13. A virtual proximity service control system according to claim 11, wherein a conversation demand and a conversation start demand can be received, concerning an address and a user's name of said communication terminal of the sender.

14. A virtual proximity service control system according to claim 5, wherein said command input means receives an approach demand in which an approaching companion is made to be a parameter, and when said command input means receives an approach demand after a conversation demand of a user is received and before a conversation start demand is received, an address and a user's name of at least a communication terminal of the sender or information obtained from image input means, group voice input means, at least sensor means or communication state control means of one of the defined groups of the communication terminal of the sender are informed to a communication terminal of a communication companion designated by a parameter at the time of the conversation demand or of an approaching companion designated by a parameter at the time of the approach demand from among users belonging to one of the defined groups transferred at the time of the conversation demand.

15. A virtual proximity service control system according to claim 14, wherein a conversation demand, an approach demand and a conversation start demand can be received, concerning an address and a user's name of the communication terminal of the sender informed by a receipt of an approach demand.

16. A virtual proximity service control system according to claim 14, wherein a communication terminal has second image input means for inputting an image of a user himself, and an image of a group inputted by image input means to be transferred due to a receipt of a conversation command is switched to an image of a user himself inputted by said second image input means of a communication terminal of a communication companion designated by a parameter at the time of a conversation demand or a parameter at the time of an approach demand.

17. A virtual proximity service control system according to claim 14, wherein a communication terminal has second image input means for inputting an image of a user himself, and an image inputted by sender image input means transferred due to a receipt of a conversation demand is switched to an image of a user himself inputted by said second image input means of a sender communication terminal.

18. A virtual proximity service control system according to claim 14, wherein information having not been transferred at the time of a receipt of a conversation demand among information obtained from image input means, group voice input means, sensor means and communication state control means of a group of companion communication terminal, is transferred, on the basis of a receipt of an approach demand by said command input means, in addition to information having been transferred at the time of a receipt of a conversation demand.

19. A virtual proximity service control system according to claim 14, wherein on the basis of a receipt of an approach demand by said command input means, an address and a user's name of at least a communication terminal of the sender or information obtained from image input means, group voice input means, at least sensor means or communication state control means of one of the defined groups of the communication terminal of the sender are transferred to a communication terminal of a third conversation companion under conversation, when a communication state of a communication terminal of an approaching companion designated by an approach demand is a conversation state.

20. A virtual proximity service control system according to claim 19, wherein a conversation demand, an approach demand and a conversation start demand can be received by command input means of the communication terminal of the third conversation companion, concerning the address and the user's name of the sender communication terminal received by the third conversation companion under conversation.

21. A virtual proximity service control system according to claim 4, further comprising:

generating means for generating a conversation demand toward a communication companion or a group selected at random at a random time.

22. A virtual proximity service control system according to claim 4, further comprising:

generating means for generating a conversation demand, toward a communication companion or a group selected at random, in the case where a communication terminal has not been operated for a predetermined time.

23. A virtual proximity service control system according to claim 5, wherein said communication state control means measures frequency of communication performed with each communication companion, further comprising:

generating means for selecting a communication companion or a group on the basis of the measured communication frequency or the variation of the communication frequency, and generating a conversation demand toward the selected communication companion or group.

24. A communication aiding system for performing communication among users by using a communication network to which communication terminals allocated to each user are connected, comprising:

a receiving unit receiving, from a sender, a first communication demand and a second communication demand to a communication companion as a receiver;

a sending unit sending, to said sender, information about a group to which said communication companion as the receiver belongs and which is defined by said communication companion as the receiver when the first communication demand is received;

a notifying unit notifying the users of said group that said sender has set the first communication demand and information about said sender, when the first communication demand is received; and a connecting unit connecting a voice link between said sender and said communication companion as the receiver, when the second communication demand is received.

25. The communication aiding system according to claim 24, wherein said information about said group includes image information of said group.

26. The communication aiding system according to claim 24, wherein said information about said group includes a name, a communication terminal address and a communication state of each user belonging to said group.

27. The communication aiding system according to claim 24, wherein said information about said group includes a name, a group name and a communication terminal address of each user belonging to another group, each user belonging to another group having set the first or second communication demand to each user belonging to said group.

28. The communication aiding system according to claim 24, wherein said information about said group includes names of other groups to which each user belonging to said group relates.

29. The communication aiding system according to claim 24, wherein said information about said sender includes a name, a group name, a communication terminal address and a communication state of said sender.

30. The communication aiding system according to claim 24, wherein said notifying unit notifies the users of said group of image of said sender, along with the information.

31. The communication aiding system according to claim 24, further comprising:
   a receiving unit receiving, from said sender, a third communication demand to a communication companion as the receiver who is a user belonging to said group or a user having set the first or second communication demand to each user belonging to said group; and
   a notifying unit notifying, to said communication companion as the receiver, hat said sender has set the third communication demand, a name, a group name, and a communication terminal address of said sender, when the third communication demand is received.

32. The communication aiding system according to claim 31, further comprising a transmission unit mutually transmitting image information between said sender and said communication companion as the receiver, when the third communication demand is received.

33. The communication aiding system according to claim 31, further comprising a notifying unit notifying the users of the group to which said communication companion as the receiver belongs that said sender has set the third communication demand to said communication companion as the receiver, the name, the group name, and the communication terminal address of said sender.

34. The communication aiding system according to claim 26, wherein said receiving unit receives, from said sender, the second communication demand to another user belonging to the same group as said communication companion as the receiver.

35. The communication aiding system according to claim 27, wherein said receiving unit receives, from said sender, the first or second communication demand to a user belonging to another group, whose name has been sent.

36. The communication aiding system according to claim 31, wherein when the third communication demand is set by a sender to one of first and second users to whom voice link has been connected, the other user of the first and second users is notified that said sender has set the third communication demand, the name, the group name, and the communication terminal address of said sender.

37. The communication aiding system according to claim 36, wherein image information is mutually transmitted between said sender and said other user when the third communication demand is set by said sender.

38. The communication aiding system according to claim 25, further comprising:
   an image acquiring unit acquiring images produced by photographing each user of the group,
   wherein said image information of said group is obtained by composing images acquired by said image acquiring unit.

39. The communication aiding system according to claim 30, further comprising:
   an image acquiring unit acquiring an overall image of the group,
   wherein said image information of said sender is obtained by cutting out a part of the image acquired by said image acquiring unit.

40. The communication aiding system according to claim 32, further comprising:
   an image acquiring unit acquiring an overall image of each group,
   wherein said image information of said sender and said image information of said communication companion as the receiver are obtained by cutting out a part of the images which have been obtained for each group by said image acquiring unit.

* * * * *